United States Patent
O'Donnell

(10) Patent No.: US 10,150,235 B1
(45) Date of Patent: Dec. 11, 2018

(54) FORMING DEVICE FOR INSULATION

(71) Applicant: Glen W. O'Donnell, Westerville, OH (US)

(72) Inventor: Glen W. O'Donnell, Westerville, OH (US)

(*) Notice: Subject to any disclaimer, the term of this patent is extended or adjusted under 35 U.S.C. 154(b) by 78 days.

(21) Appl. No.: 15/411,574

(22) Filed: Jan. 20, 2017

Related U.S. Application Data

(63) Continuation-in-part of application No. 13/908,324, filed on Jun. 3, 2013.

(60) Provisional application No. 61/788,624, filed on Mar. 15, 2013, provisional application No. 61/658,583, filed on Jun. 12, 2012, provisional application No. 61/655,257, filed on Jun. 4, 2012.

(51) Int. Cl.
| | |
|---|---|
| *B29C 44/58* | (2006.01) |
| *B29C 44/12* | (2006.01) |
| *E04B 1/62* | (2006.01) |
| *E04B 1/76* | (2006.01) |
| *B29C 44/10* | (2006.01) |
| *B29C 44/36* | (2006.01) |
| *E04B 5/02* | (2006.01) |
| *B29K 75/00* | (2006.01) |
| *B29K 105/04* | (2006.01) |

(52) U.S. Cl.
CPC .............. *B29C 44/58* (2013.01); *B29C 44/10* (2013.01); *B29C 44/1219* (2013.01); *B29C 44/367* (2013.01); *E04B 1/7654* (2013.01); *B29K 2075/00* (2013.01); *B29K 2105/04* (2013.01); *E04B 5/02* (2013.01); *E04B 2001/7679* (2013.01)

(58) Field of Classification Search
None
See application file for complete search history.

(56) References Cited

U.S. PATENT DOCUMENTS

| | | | | |
|---|---|---|---|---|
| 3,705,777 | A | * 12/1972 | Witkowski | E04F 21/08 249/15 |
| 4,177,618 | A | 12/1979 | Felter | |
| 6,112,490 | A | 9/2000 | Meyer | |
| 6,350,308 | B1 | 2/2002 | Dickens | |
| 7,127,856 | B2 | 10/2006 | Hagen, Jr. et al. | |
| 7,748,933 | B1 | * 7/2010 | Edwards | B23D 71/08 407/29.1 |
| 2002/0124753 | A1 | 9/2002 | Hadden | |
| 2002/0184841 | A1 | 12/2002 | Diamond | |

(Continued)

OTHER PUBLICATIONS

"Sculpting with Spray Foam", Demand Foam Systems article, Demand Products, Inc., Oct. 2012.

*Primary Examiner* — Jeffrey M Wollschlager
*Assistant Examiner* — Armand Melendez
(74) *Attorney, Agent, or Firm* — James R. Eley; Ronald J. Koch; Eley Law Firm Co.

(57) ABSTRACT

A forming device includes a closure, an exterior face, and one or more guides. The closure is sized and shaped to substantially close off an opening of a select space, and the exterior face is configured to confront and shape insulation. The forming device may further include a plurality of lip members extending away from the closure, the lip members being contiguous with the closure and generally surrounding the closure. The lip members may be curved. Insulation is applied to the forming device and it is inserted and held in place to allow the insulation to expand and harden.

6 Claims, 23 Drawing Sheets

(56) References Cited

U.S. PATENT DOCUMENTS

| | | |
|---|---|---|
| 2005/0188649 A1 | 9/2005 | Hagen |
| 2005/0205459 A1 | 9/2005 | Mogil et al. |
| 2006/0003044 A1 | 1/2006 | Dinello et al. |
| 2007/0045897 A1 | 3/2007 | Alexander et al. |
| 2007/0214739 A1 | 9/2007 | Sherner |
| 2009/0321433 A1* | 12/2009 | Colligan ............ H02G 3/14 220/3.2 |
| 2010/0107535 A1 | 5/2010 | Lembo |
| 2012/0261053 A1 | 10/2012 | O'Leary et al. |
| 2012/0263817 A1 | 10/2012 | O'Leary et al. |
| 2015/0140288 A1* | 5/2015 | Yang ............ B29C 59/02 428/195.1 |

* cited by examiner

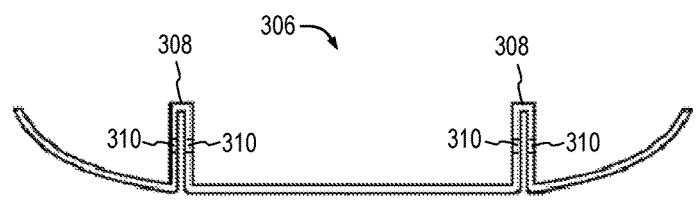
*Fig. 12A*
*Fig. 12B*
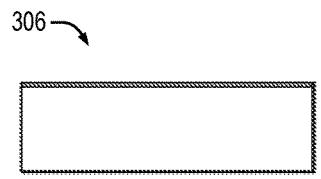
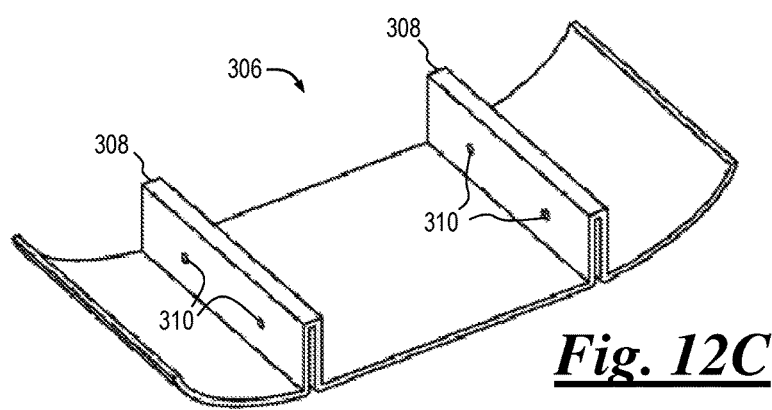
*Fig. 12C*

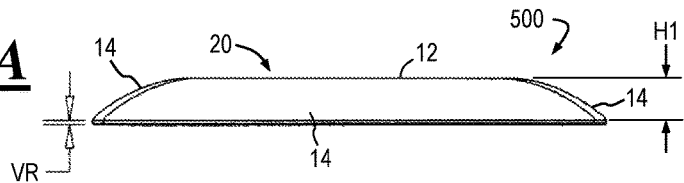
*Fig. 15A*
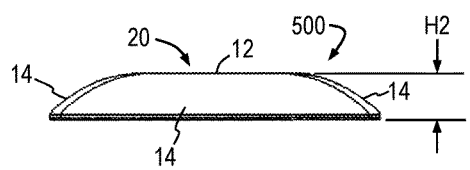
*Fig. 15B*
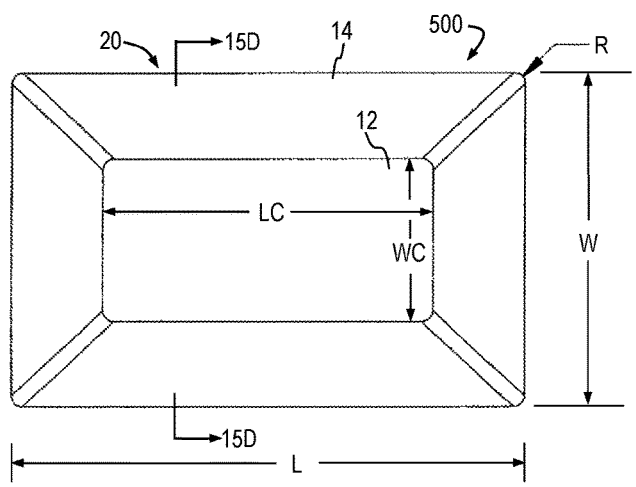
*Fig. 15C*
*Fig. 15D*
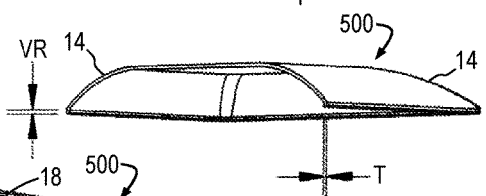
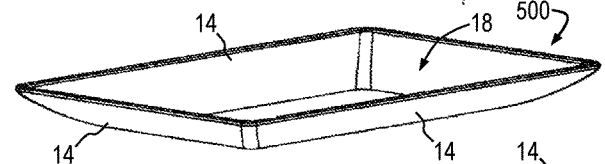
*Fig. 15E*
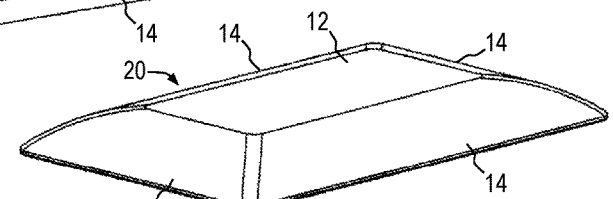
*Fig. 15F*

FORMING DEVICE FOR INSULATION

CROSS-REFERENCE TO RELATED APPLICATIONS

This application is a continuation-in-part of U.S. patent application Ser. No. 13/908,324, filed Jun. 3, 2013, which claims priority to U.S. provisional application 61/655,257, filed Jun. 4, 2012, U.S. provisional application 61/658,583, filed Jun. 12, 2012, and U.S. provisional application 61/788,624, filed Mar. 15, 2013, the entire contents of each application being incorporated by reference.

FIELD

The present invention relates generally to devices to aid in the installation of insulation, in particular to a device to temporarily confront and form or shape foam-type insulation during installation of the foam insulation.

BACKGROUND

A "rim joist" or "band joist" of a building structure's floor rests on a sill or a sill plate and functions to keep the floor's joists true. The rim joist also provides a surface for completing the edge of subflooring and a flat base from which to support exterior walls. The rim joist forms a first wall of a rim joist cavity or "box," while adjoining floor joists extending generally perpendicularly away from the rim joist form second and third walls of the box. A subfloor typically forms a top of the box, while the sill or sill plate forms a bottom of the box. An opening opposite the rim joist provides access to the box.

The rim joist can be a significant source of drafts, especially in older building structures with stone and masonry foundations. Drafts are often pulled from the rim joist and through the structure, into openings provided for plumbing pipes, electrical conduit and the like. By sealing off the rim joist box and the various openings the comfort level for occupants of the building structure can be increased and energy costs for the building structure can be reduced.

A relatively efficient way to insulate a rim joist box is to utilize a suitable expanding-foam insulation. To install the expanding-foam insulation a suitable resin and a foaming agent are typically brought together within a mixing chamber of an applicator gun to produce the expanding-foam insulation. The mixture of insulating foam is then quickly injected or is otherwise dispensed into the rim joist box through the opening of the box. Upon entering the rim joist box the insulation material, which is usually in the form of a relatively heavy lather, rapidly expands in volume to at least partially fill the box. The insulation, once cured, sets up into a generally uniform insulative structure to provide a thermal and/or acoustical barrier.

A drawback of using expanding-foam insulation to fill a rim joist box is that the insulation is subject to overflowing out the opening of the box during the expansion phase of the insulating foam, resulting in wasted insulation material and producing an unsightly appearance. Prior efforts to limit this overflow have been attempted by using cardboard or string restraints to close off the opening. However, insulating rim joint boxes in this manner is a messy proposition and often still leads to an unprofessional finished appearance. There is a need for a way to efficiently and effectively install expanding-foam insulation.

SUMMARY

An insulation forming device is disclosed according to several embodiments of the present invention. The insulation forming device is preferably made from (or coated with) a non-stick material with respect to the insulation. In use, a suitable amount of expanding-foam insulation is dispensed onto the insulation forming device or into an opening of a select rim joist box. Once the expanding-foam insulation has been dispensed the forming device is placed into the opening of the select rim joist box, thereby substantially closing off the opening of the box. As the insulating foam cures it expands in volume and generally conforms to a confronting face of the insulation forming device, generally taking on the shape of the confronting face of the forming device. When the insulating foam has cured (typically by air-drying) for a period of time the forming device may be removed, leaving a finished exposed surface of the insulating foam that generally conforms to the shape of the confronting face of the forming device.

In one embodiment of the present invention a forming device includes a closure and an exterior face. The closure is sized and shaped to substantially close off an opening of a select space, and the exterior face is configured to confront and shape insulation. The forming device may further include a plurality of lip members extending away from the closure, the lip members being contiguous with the closure and generally surrounding the closure. The lip members may have a predetermined curvature.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 12A-12C show side elevational, end elevational and perspective views respectively of a bracket for an insulation forming device according to an embodiment of the present invention;

FIGS. 15A-15F show side elevational, end elevational, top plan, sectional, interior perspective and exterior perspective views respectively of an insulation forming device according to yet another embodiment of the present invention;

DETAILED DESCRIPTION

Figure 1:
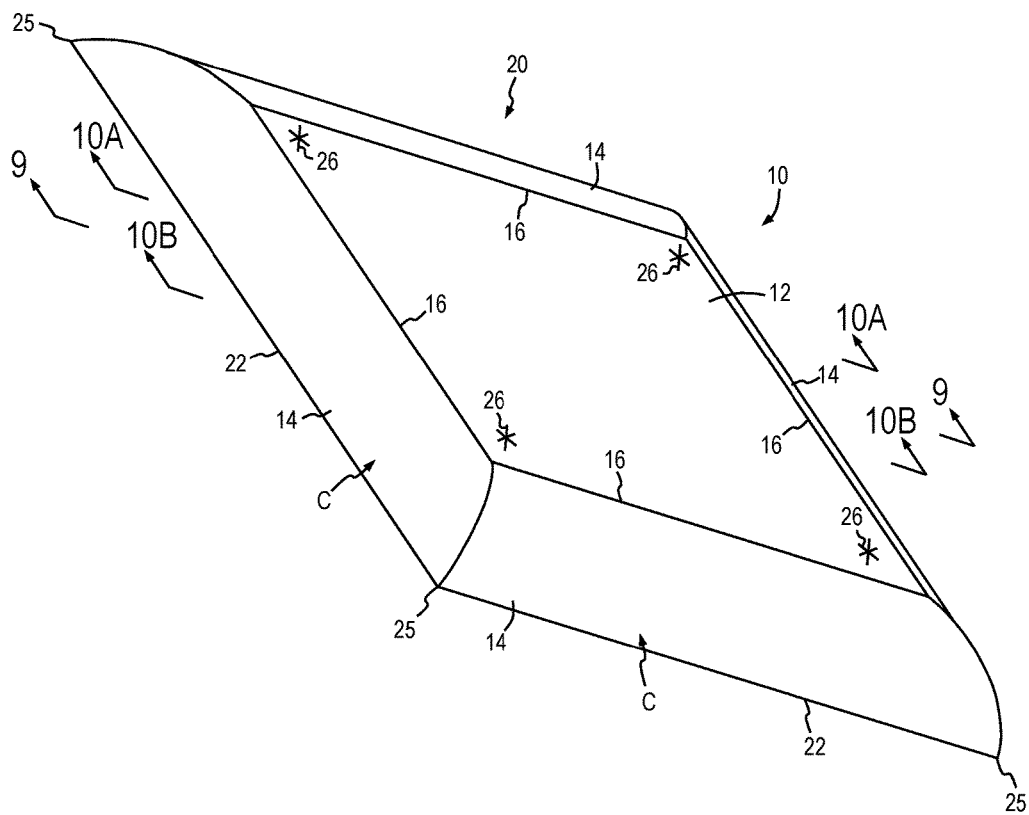
FIG. 1 is a perspective view of an exterior face of an insulation forming device according to an embodiment of the present invention.

In the discussion that follows, like reference numerals are used to refer to like elements and structures in the various figures. In addition, the terms "insulation," "foam insulation," "insulating foam," "expanding foam insulation," "foam" and similar variations are used interchangeably herein to describe any insulating material suitable for use with the present invention.

The general arrangement of an insulation forming device 10 is shown in FIGS. 1 through 4 according to an embodiment of the present invention. Insulation forming device 10 comprises a generally planar closure 12 that is sized and shaped to substantially close off an opening of a select space to be insulated (see, e.g., FIGS. 7 and 8). Closure 12 may be generally surrounded by a plurality of lip members 14 that are contiguous with corresponding edges 16 of closure 12 and extend away from the edges of the closure.

Figure 2:
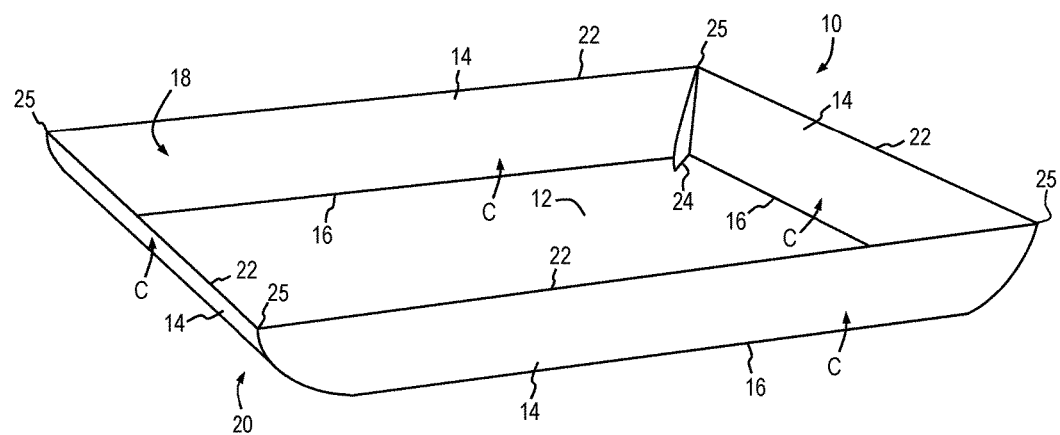
FIG. 2 is a perspective view of an interior portion of the insulation forming device of FIG. 1.
Figure 4:
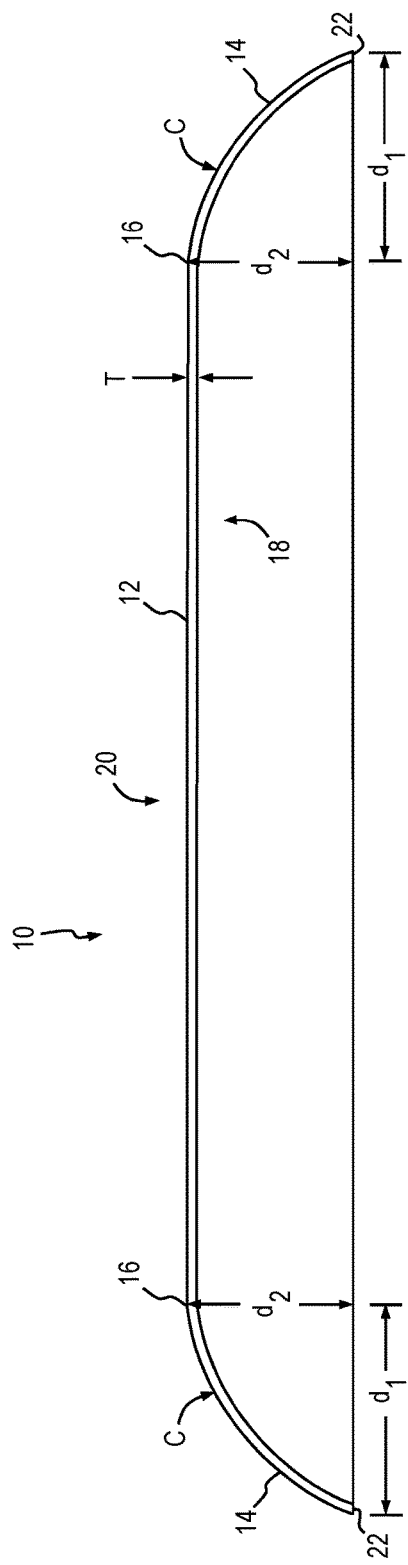
FIG. 4 is a view in section of the insulation forming device of FIG. 1.

Insulation forming device 10 further includes an interior portion 18, and an exterior face 20 comprising outer surfaces of closure 12 and lip members 14. The exterior face 20 is placed facing into the opening of the space to be insulated, and is adapted to confront and shape the insulation (see, e.g., FIGS. 7 and 8). In one embodiment interior portion 18 and exterior face 20 have generally corresponding, opposing surfaces, as generally shown in FIGS. 1, 2 and 4. In other embodiments the surfaces of interior portion 18 and exterior face 20 may be non-planar, and may include differing shapes or features.

In some embodiments the surfaces of interior portion 18 and exterior face 20 may be generally smooth. Alternatively, the surfaces of interior portion 18 and exterior face 20 may have some surface roughness or texture. If textured, the texture may further include a pattern.

Figure 7:
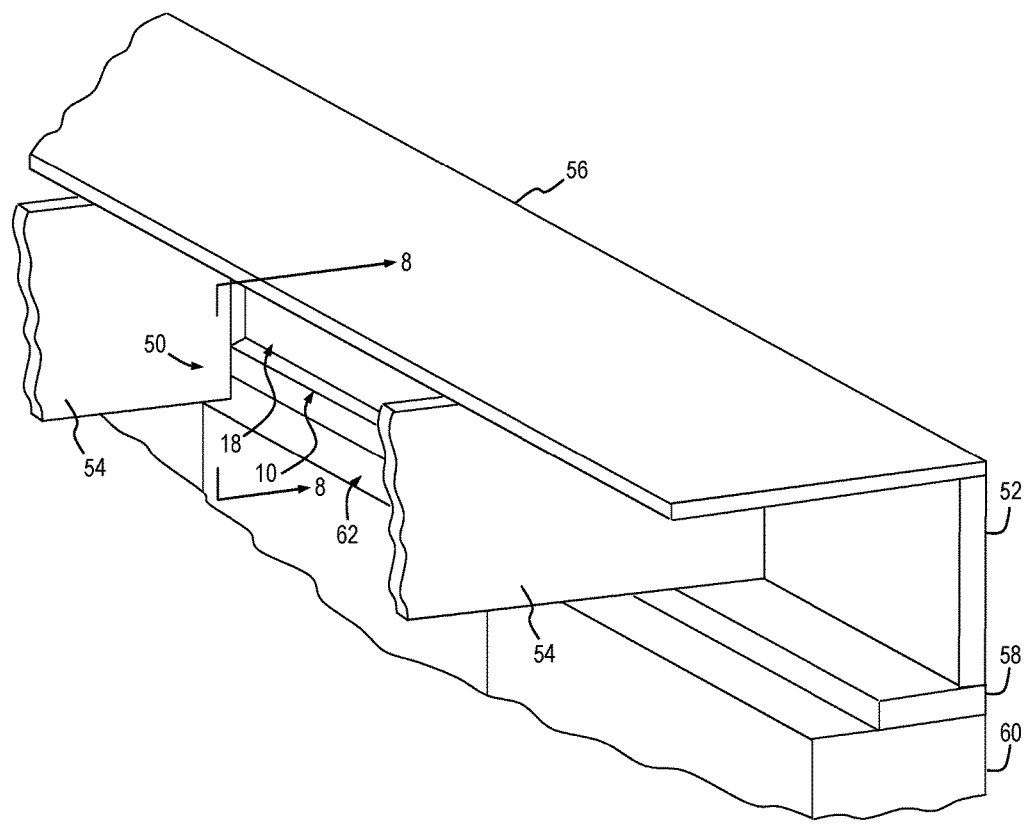
FIG. 7 shows the rim joist box of FIG. 6 with an insulation forming device substantially closing off an opening of the box according to an embodiment of the present invention.
Figure 8:
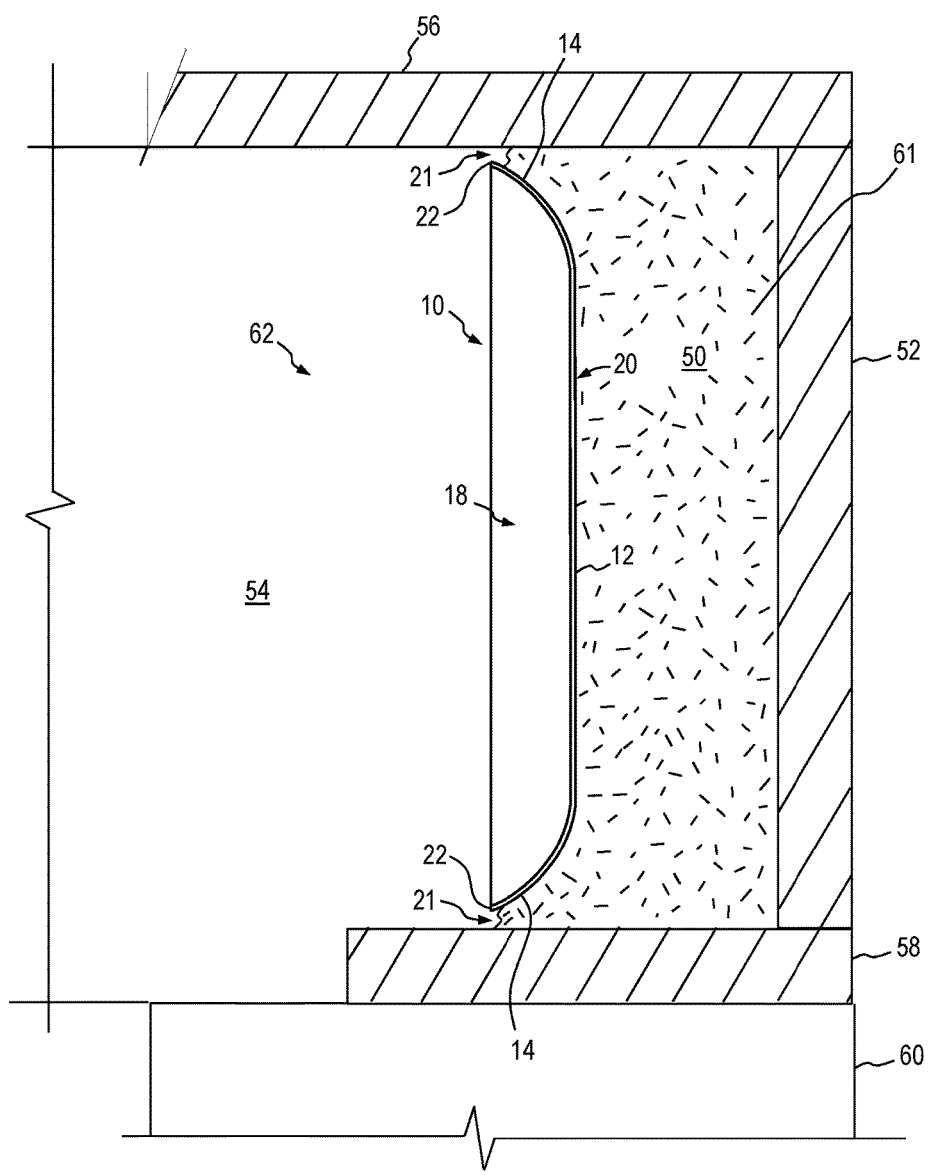
FIG. 8 is a view in section of a portion of FIG. 7.

As shown in FIGS. 7 and 8, insulation forming device 10 is preferably sized and shaped such that lip members 14 fit proximate the edges and surfaces delimiting an opening of a rim joist box, and substantially close off the opening. In one embodiment insulation forming device 10 is sized and shaped to substantially close off the opening with about a ⅛ inch to ¼ inch gap 21 between outer or distal edges 22 of lip members 14 of the insulation forming device and the aforementioned edges and surfaces delimiting the opening of the rim joist box.

In non-limiting example embodiments of insulation forming device 10 the device may be configured for a rectangularly-shaped opening and may be generally rectangularly-shaped and sized at about 9 inches by 14 inches, about 6⅞ by 14 inches, or about 10⅞ by 14 inches. However, generally rectangularly-shaped forming devices having greater or lesser dimensions are envisioned within the scope of the invention.

In other embodiments insulation forming device 10 may have any suitable regular or irregular shape that is configured to substantially close off a space to be insulated. Non-limiting example shapes for insulation forming device 10 may also include geometric shapes such as polygons, curved shapes, and portions thereof. As can be appreciated, insulation forming device 10 is not limited to these examples, but rather may be made in any size and shape that is suitable for substantially closing off any space to be insulated.

With reference again to FIG. 4, insulation forming device 10 may have any suitable thickness "T." As a non-limiting example, thickness "T" may have a dimension of about 3/32 inches. Thickness "T" of insulation forming device 10 may be generally uniform, or portions of the insulation forming device may be varied in thickness as desired.

Lip members 14 may serve as a transition or bridge between closure 12 and edges or boundaries delimiting an opening of a rim joist box, as detailed further below. Lip members 14 may be generally curved or bowed, as shown in FIGS. 1 through 4. Lip members 14 may also have any other suitable shape desired for forming expanding-foam insulation. In one non-limiting example, lip members 14 may have a general curvature "C" (FIG. 4) wherein a first dimension "$d_1$" ranges between about 1.72 to 1.76 inches and a second dimension "$d_2$" is about 1 inch.

As noted above, the shape of lip members 14 may be varied as desired. For example, the slope (or radius) of curvature "C" of lip members 14 may be constant, or may be non-constant in any suitable manner. Furthermore, the dimensions "$d_1$" and "$d_2$" of lip members 14 and curvature "C" may be altered within the scope of the invention. As non-limiting examples dimension "$d_1$" may be increased or decreased independently of dimension "$d_2$." Likewise, dimension "$d_2$" may be increased or decreased independently of dimension "$d_1$." Curvature "C" may also comprise an elliptical and/or circular arc. In sum, curvature "C" may have any desired shape extending between edges 16 of closure 12 and edges 22 of lip members 14.

The curvature of lip members 14, or angle of lip members 602 (discussed below) provides an important advantage of the present invention. The curve/angle reduces the buildup of foam that expands passed the form's edge. Flat forms and plastic barriers over forms don't work as well and result in a sloppy end result.

Optionally, insulation forming device 10 may include one or more grips 24 extending from interior portion 18, as shown in FIG. 2. Grips 24 may be grasped by a user when handling and positioning insulation forming device 10 as detailed below. Grips 24 may be made separately and joined to insulation forming device 10, or may be made integral with the insulation forming device. Grips 24 may also extend from edges 22 of lip members 14.

Insulation forming device 10 may be made from any suitable material including, without limitation, metal, plastic, fiberglass and composites. Preferably, insulation forming device 10 is made from a non-stick material with respect to the expanding-foam insulation selected for use with the forming device. As one example, insulation forming device 10 may be made from low-density polyethylene. Other materials for insulation forming device 10 may include, without limitation, polypropylene (PP), high-density polyethylene, (HDPE), high molecular weight polyethylene (HMWPE) and ultra-high molecular weight polyethylene (UHMWPE). In still other embodiments insulation forming device 10 may be a polyethylene-laminated form, a form made from polytetrafluoroethylene (PTFE) material, or a substrate form that is laminated or is otherwise coated with PTFE.

Optionally, insulation forming device 10 may be made from a generally transparent, tinted or un-tinted material. Insulation forming device 10 may also be a solid base color (such as black). Partially or wholly recycled materials may also be selected for making insulation forming device 10, as appropriate.

Insulation forming device 10 may be made in any suitable manner such as, without limitation, machining, casting, forming and molding. Insulation forming device 10 may be finished in any suitable manner, such as with molded-in colors, painting, plating, cladding, tinting, or may be left unfinished. The select finish preferably does not degrade the non-stick properties of insulation forming device 10 with respect to the expanding foam insulation.

In some embodiments of insulation forming device 10 some or all of the surfaces of the device, and particularly exterior face 20, may be coated with a suitable release agent with respect to the expanding-foam insulation. The release agent may be, for example, a generally permanent coating of any of the aforementioned non-stick materials. Accordingly, in these embodiments the material selected for insulation forming device 10 need not necessarily be a non-stick material with respect to the selected expanding-foam insulation, the release agent coating acting as a barrier to protect undesirable adhesion of the insulation to the insulation forming device.

Alternatively, a release agent may be applied to some or all of the surfaces of the device, and particularly exterior face 20, with each use of insulation forming device 10. Examples of such applied release agents include, but are not limited to, sawdust, talcum powder, and silicone materials such as silicone oil and silicone lubricants.

Insulation forming device 10 may be formed with lip members 14 made integral with closure 12. Alternatively, closure 12 and lip members 14 may be formed separately and then coupled or joined to one another in any suitable manner.

In some embodiments of the present invention closure 12 and/or lip members 14 may include features such as, but not limited to, decorative insulation-forming elements such as shapes or patterns embossed, machined, molded or otherwise formed in exterior face 20. A set of decorative elements 26 are shown in FIG. 1 as one non-limiting example.

Figure 5:
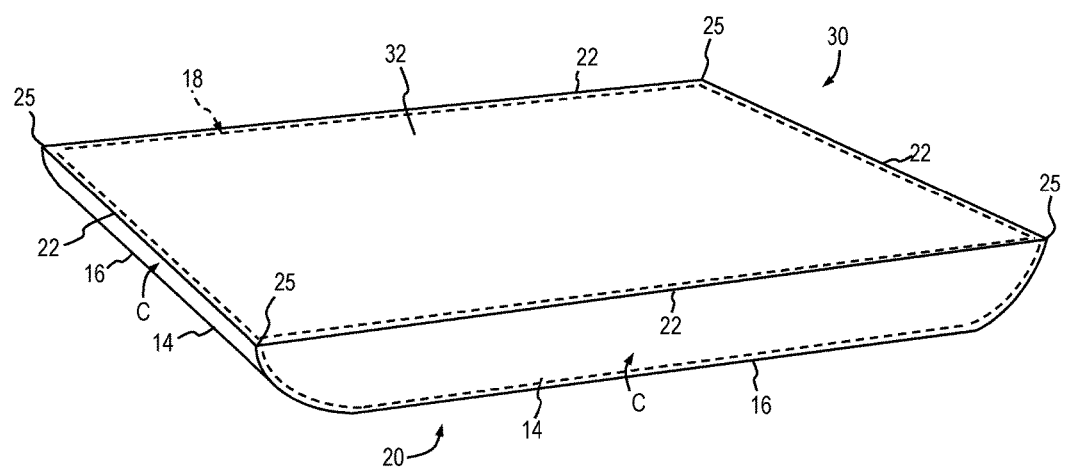
FIG. 5 shows an insulation forming device according to an alternate embodiment of the present invention.

An insulation forming device 30 is shown in FIG. 5 according to an alternate embodiment of the present invention. Insulation forming device 30 has a rear enclosure 32, which may be generally planar, substantially closing off interior portion 18. Interior portion 18 of insulation forming device 30 may be hollow, or may be filled with a desired filling material. Rear enclosure 32 may optionally include one or more grips extending therefrom, such as grip 24 (FIG. 2), or suitably sized and shaped apertures, depressions, cavities, finger holds, etc. to provide a gripping structure for installing insulation forming device 30 into a rim joist cavity and for removing the device therefrom. Alternatively, insulation forming device 30 may be made as a solid (i.e., generally non-hollow) piece such that rear enclosure 32 is a rear surface. Insulation forming device 30 is otherwise similar to insulation forming device 10.

Figure 6:
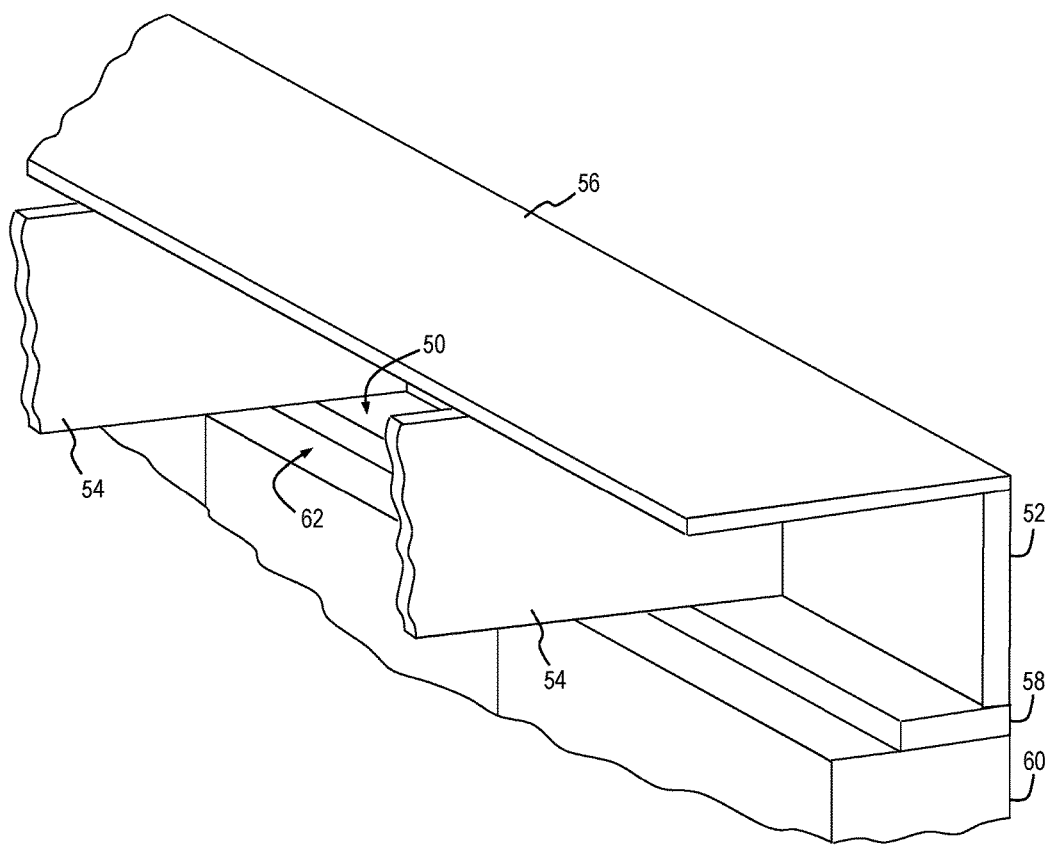
FIG. 6 shows details of a rim joist box.

An example rim joist cavity or "box" 50 of a building structure is shown in FIG. 6 according to an embodiment of the present invention. A rim joist 52 forms a first wall of rim joist box 50, while a set of adjoining, spaced-apart floor joists 54 extend generally perpendicularly away from the rim joist to form second and third walls of the box. A subfloor 56 forms a top of box 50, while a sill plate 58 forms a bottom of box 50. A foundation or wall 60, upon which sill plate 58 rests, may also form at least a portion of the bottom of box 50. An opening 62 opposite rim joist 52 provides access to box 50.

With reference to FIGS. 1, 7 and 8 together, in use of insulation forming device 10 a suitable amount of expanding-foam insulation 61 is dispensed onto exterior face 20 of closure 12 by any suitable means. Alternatively, the insulation 61 may be dispensed into box 50.

Any suitable type of insulation material may be used in connection with insulation forming device 10, including urea-formaldehyde foam insulation. One type of expanding-foam insulation is provided in a pressurized container having a selectably actuable dispensing nozzle for dispensing the foam. An example commercial product of this type of insulation is GREAT STUFF™ insulating foam sealant, provided by Dow Chemical Company of Midland, Mich.

Other types of suitable expanding-foam insulation 61 include TOUCH 'N FOAM® brand sealants provided by Convenience Products of Fenton, Mo., and HANDI FOAM (ECO FOAM) Polyurethane Foam Sealant 10% soy renewable resources, made in the USA by Foma Products, Inc—Norton, Ohio. A particularly suitable sealant provided by Convenience Products is TOUCH 'N FOAM NO WARP WINDOW & DOOR SEALANT®, an expanding polyurethane foam insulating material that is configured to seal and insulate without exerting significant pressure upon adjacent structures while expanding. In addition, the low-pressure foam insulation is "self-venting" such that, once the foam insulation fills a void, trapped gasses in the foam leave the foam, unlike some polyurethane insulating foams that may continue to expand and apply pressure upon adjacent structures.

Once the expanding-foam insulation 61 has been dispensed onto exterior face 20 (and/or into box 50) insulation forming device 10 is placed into opening 62 with the exterior face of the insulation forming device facing into the opening (i.e., toward rim joist 52), thereby substantially closing off the opening. Insulation forming device 10 may be sized and shaped to substantially close off opening 62 with a gap 21 between outer or distal edges 22 of lip members 14 of the insulation forming device and at least a portion of the aforementioned edges and surfaces delimiting the opening of the rim joist box, as shown in FIG. 8.

A slight adhesive property of the expanding-foam insulation 61 typically aids to hold insulation forming device 10 in place. However, in some embodiments securing devices may optionally be used to temporarily further secure insulation forming device 10 in place closing off opening 62 of the rim joist box 50. Example securing devices may include, without limitation, screws, nails, tape and fasteners.

As the insulating foam 61 expands within box 50 it generally confronts exterior face 20 and generally conforms to the exterior face of insulation forming device 10, thereby taking on the shape of the exterior face, which may include the exterior surfaces of closure 12 and lip members 14. After a period of time insulating foam 61 is cured, typically by air-drying. When the insulating foam 61 has cured insulation forming device 10 may be removed from opening 62. In doing so, insulation forming device 10 is easily separated from the cured insulating foam 61 by virtue of the non-stick nature of the material selected for the insulation forming device and/or the non-stick coating or release agent that is applied to exterior face 20, as discussed above. Once removed, insulation forming device 10 may be re-used for insulating other rim joist boxes 50. Alternatively, if desired, the above-described insulating process may be repeated for select rim joist boxes 50, thereby "stacking" together facially adjacent cured layers of insulating foam 61 to build up a relatively thick layer of cured insulation in the boxes.

In an optional embodiment of the present invention, insulation forming device 10 may further include one or more pressure-relief apertures 28 (FIG. 3) extending through the insulation forming device. When insulation forming device 10 is in place and closing off opening 62 of box 50, apertures 28 may provide a pressure-relief path for the expanding insulating foam 61, allowing a portion of the insulating foam to expand through the apertures rather than exerting pressure on the insulation forming device. This pressure relief reduces the amount of force exerted against insulation forming device 10 by insulating foam 61 as the insulating foam expands and confronts exterior face 20. Once the insulating foam 61 has cured, any insulation extending through apertures 28 may be trimmed away prior to removing insulation forming device 10 from opening 62.

Figure 9:
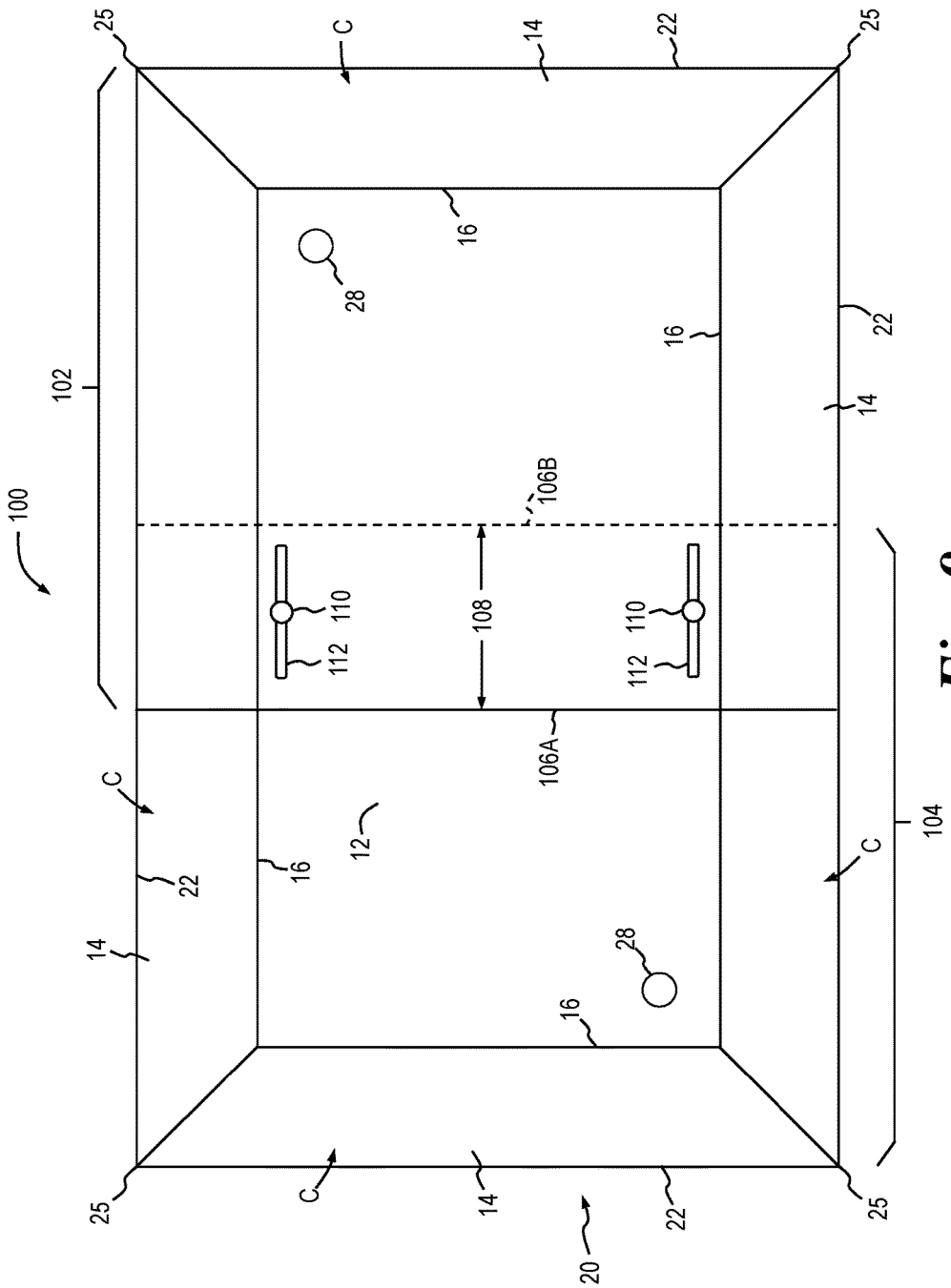
FIG. 9 is a top plan view of the exterior face of an insulation forming device according to another alternate embodiment of the present invention.

If a box 50 is smaller in size than the dimensions of a given insulation forming device the device may be modified as needed to fit the box. With reference to FIG. 9, an insulation forming device 100 may be formed by separating an insulation forming device 10 of FIG. 1, for example, into a first portion 102 and a second portion 104 by generally cutting along the line 9-9 of FIG. 1. The resulting exposed cut edges 106A, 106B of first portion 102 and second portion 104 respectively, may be overlapped by a select amount 108 for the insulation forming device 100 to suitably fit into and close off the box 50. Once the appropriate amount of overlap 108 has been determined the first and second portions 102, 104 may be fastened together by any suitable means including, without limitation, one or more fasteners 110, adhesives and solvent welds. One skilled in the art will appreciate that insulation forming device 10 of FIG. 1 may be similarly cut along a line generally orthogonal to line 9-9 to form device 100, thereby modifying the transverse dimension of the insulation forming device. Similarly, distal ends and edges (such as outer edges 22) of insulation forming device 10 may be trimmed as needed to fit a select box 50. First and second portions 102, 104 may also optionally include slots 112 to facilitate slidable adjustment of the size of device 100 about fasteners 110.

It should also be noted that either or both of first portion 102 and second portion 104 may be made as separate pieces and assembled together as described above, rather than initially forming the first and second pieces from a unitary insulation forming device. In one embodiment, a nut having a 5/16" nut head with small flange is used with fastener 110. No washer is needed in this embodiment.

Figure 10:
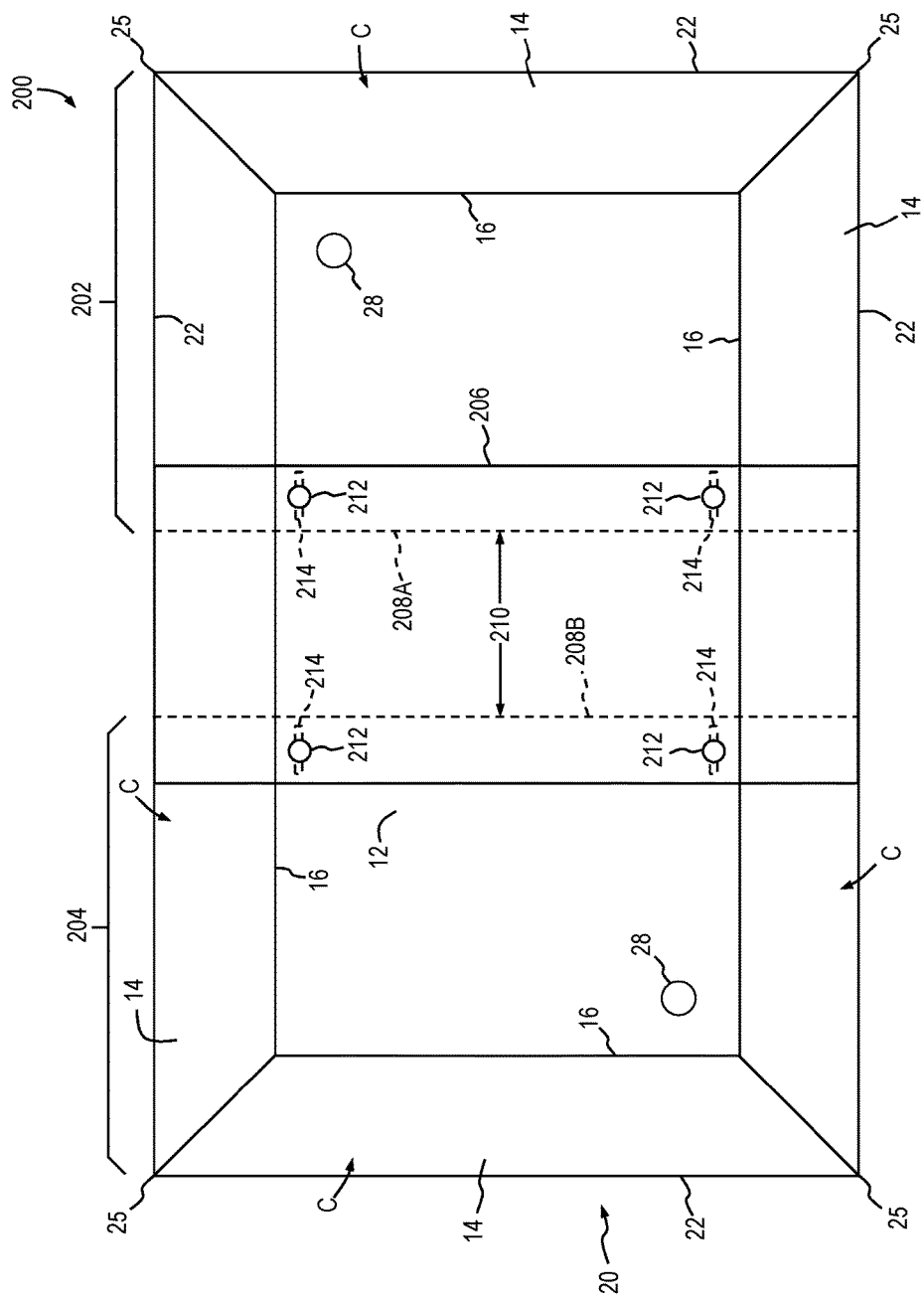
FIG. 10 is a top plan view of the exterior face of an insulation forming device according to yet another alternate embodiment of the present invention.

In yet another alternate embodiment of the present invention an insulation forming device 200, shown in FIG. 10, may be formed by separating an insulation forming device 10 into a first portion 202 and a second portion 204 by generally cutting along the line 10A-10A, and along line 10B-10B of FIG. 1. A third portion 206 is formed from the material of insulation forming device 10 formerly extending between lines 10A-10A and 10B-10B. The resulting exposed cut edges 208A, 208B of first and second portions 202, 204 respectively may be spaced apart from one another by a select spacing amount 210, with third portion 206 extending between the first and second portions by an amount sufficient for the insulation forming device 200 to suitably fit into and close off the box 50. Once the appropriate amount of spacing 210 has been determined the first, second and third portions 202, 204, 206 may be assembled together by any suitable means including, without limitation, fasteners 212, adhesives and solvent welds. In assembling together the first, second and third portions 202, 204, 206 the third portion may be located upon exterior face 20 as shown in FIG. 10, or may be located within interior portion 18.

One skilled in the art will appreciate that insulation forming device 10 of FIG. 1 may be similarly cut along lines generally orthogonal to lines 10A-10A, 10B-10B of FIG. 1 to form insulation forming device 200, thereby modifying the transverse dimension of the insulation forming device. Similarly, distal ends and edges (such as outer edges 22) of insulation forming device 10 may be trimmed as needed to fit a select box 50. It should also be noted that spacing 210 may be about zero in some embodiments such that the cut edges 208A, 208B of first and second portions 202, 204 respectively generally abut one another. First and second portions 202, 204 may also optionally include slots 214 to facilitate slidable adjustment of the size of device 200 about fasteners 212.

It should also be noted that any or all of first portion 202, second portion 204 and third portion 206 may be made as separate pieces and assembled together as described above, rather than initially forming the first, second and third pieces from a unitary insulation forming device.

Figure 11A:
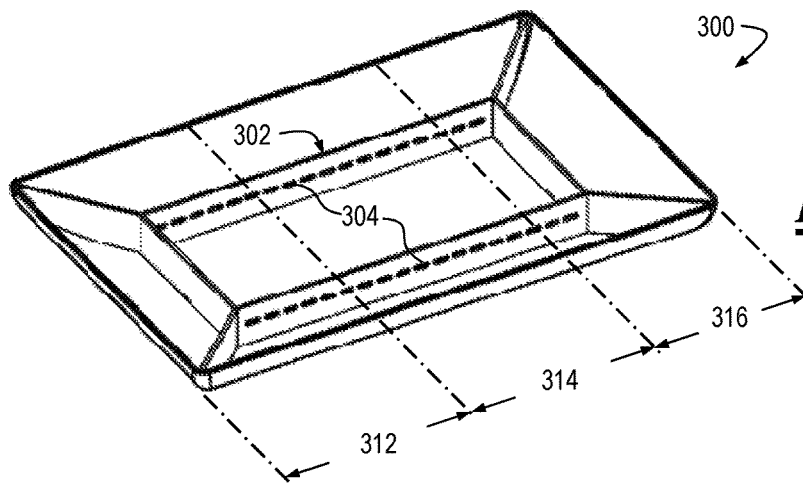
FIGS. 11A-11C show perspective, cutaway and top plan views respectively of an insulation forming device with a support member according to still another embodiment of the present invention.
Figure 11B:
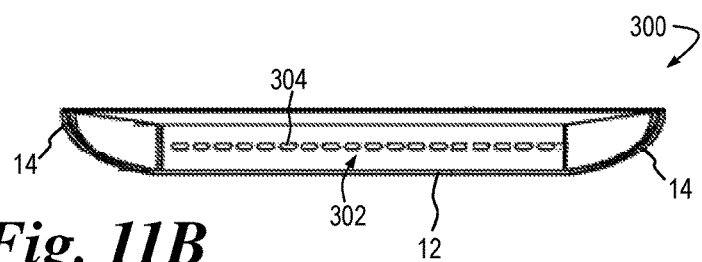
Figure 11C:
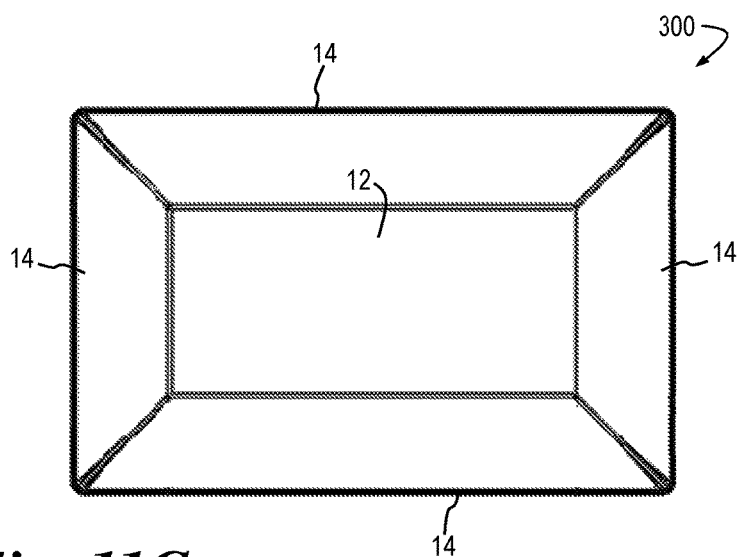

FIGS. 11A-11C show various views of an insulation forming device 300 with a support member 302, that, among other things, provides rigidity and structural support for the insulation forming device. Support member 302 further includes a plurality of support member apertures 304 extending therethrough, as shown in FIGS. 11A and 11B.

FIGS. 12A-12C show various views of a bracket 306 for use with insulation forming device 300 according to still another embodiment of the present invention. Bracket 306 further includes a pair of connector members 308 having one or more connector apertures 310 extending therethrough.

Figure 13A:
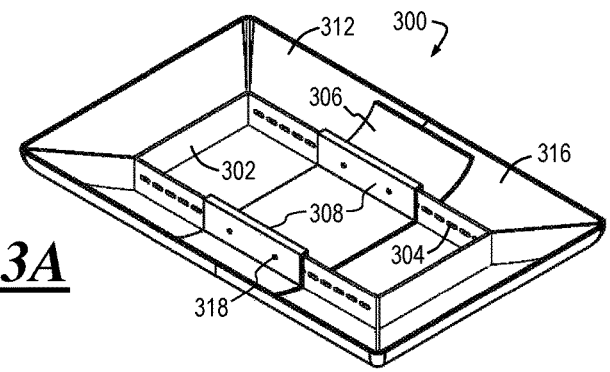
FIGS. 13A-13C show perspective views of the insulation forming device of FIGS. 11A-11C with the bracket of FIGS. 12A-12C joined thereto.
Figure 13B:
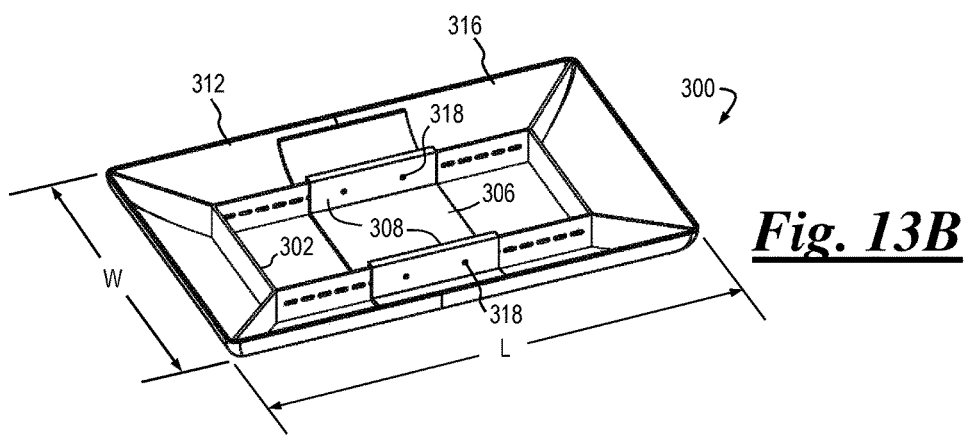
Figure 13C:
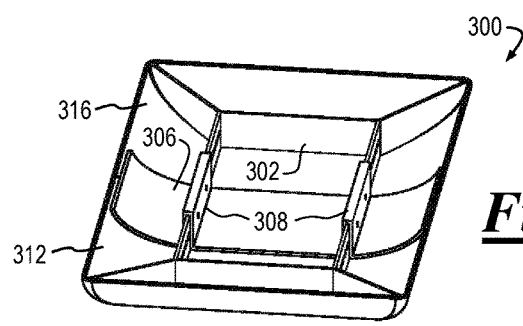

FIGS. 13A-13C show various views of the insulation forming device 300 of FIGS. 11A-11C with the bracket 306 of FIGS. 12A-12C fastened thereto. With reference to FIGS. 11A-11C and FIGS. 13A-13C, the length "L" of the insulation forming device 300 may be reduced by cutting the device into a first end portion 312, an intermediate portion 314, and a second end portion 316 such that each end portion includes a portion of the support member 302; removing the intermediate portion 314; and then assembling together the first and second end portions 312, 316 respectively with bracket 306 and a suitable set of fasteners 318 such as screws extending through aligned apertures 304, 310 of the end portions and the bracket 306. Alternatively, end portions 312, 316 and bracket 306 may be assembled together with plastic weld, tape or adhesive.

As can be seen in FIGS. 13A-13C, first end portion 312 includes a first portion of support member 302, while second end portion 316 includes a second portion of the support member. Connector members 308 of bracket 306 engage the first and second portions of support member 302, the first and second end portions 312, 316 respectively being assembled to the bracket and secured with fasteners 318 as described above.

Conversely, in still other embodiments the length "L" of insulation forming device 300 may be configured to be expanded or lengthened by separately forming a bracket 306 having suitable dimensions and spacing of connector apertures 310 such that end portions 312, 316 are spaced apart from one another and fastened or joined to the bracket in the manner described above.

Optionally, forming device 300 may be cut into two pieces, e.g. first end portion 312, second end portion 316 such that each end portion includes a portion of the support member 302. In this configuration no intermediate portion 314 is removed from the forming device.

With continued reference to FIGS. 13A-13C, it will be appreciated that a dimension "W" of insulation forming device 300 may be reduced or expanded in a similar manner.

Figure 3:
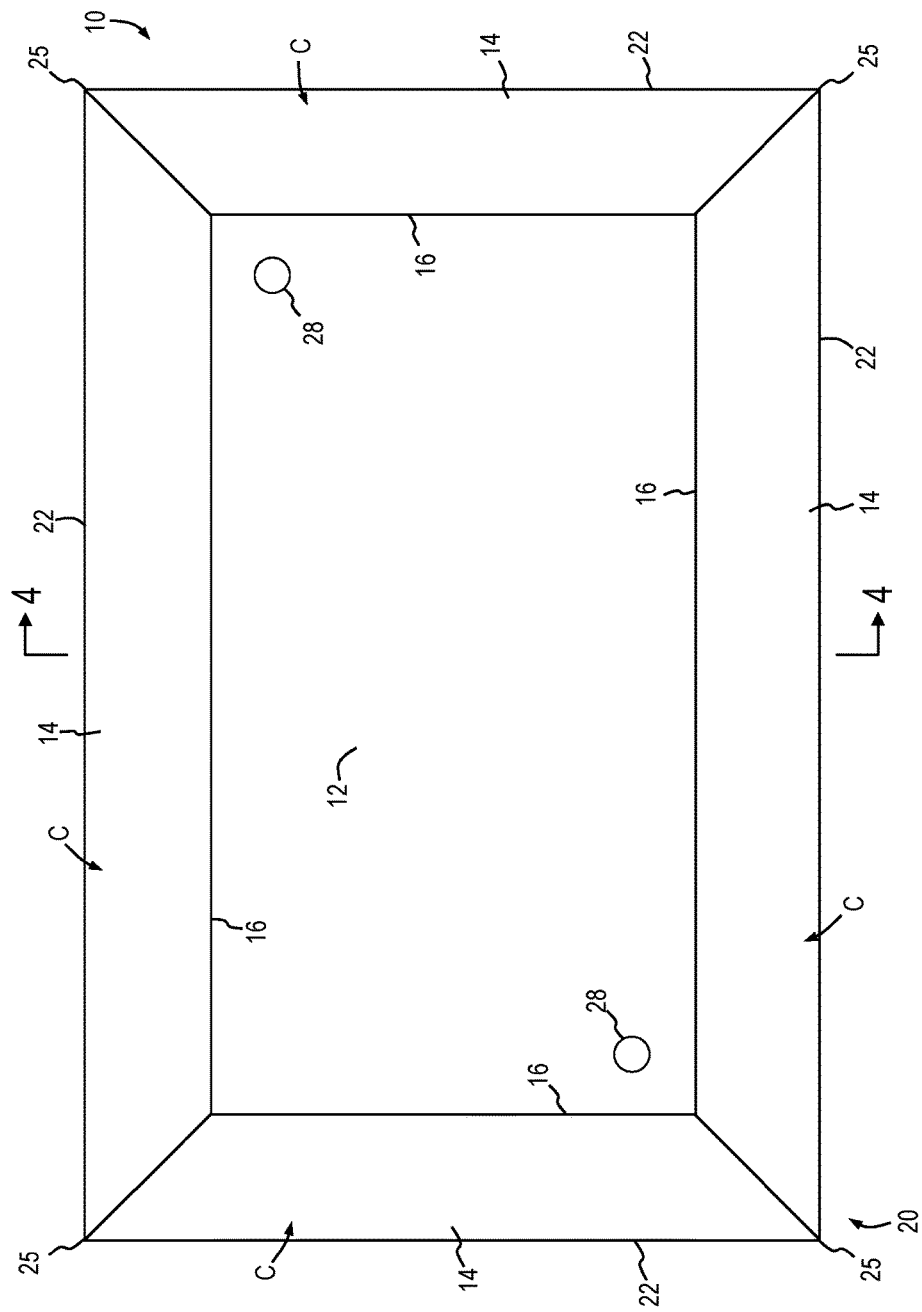
FIG. 3 is a top plan view of the exterior face of the insulation forming device of FIG. 1.
Figure 14:
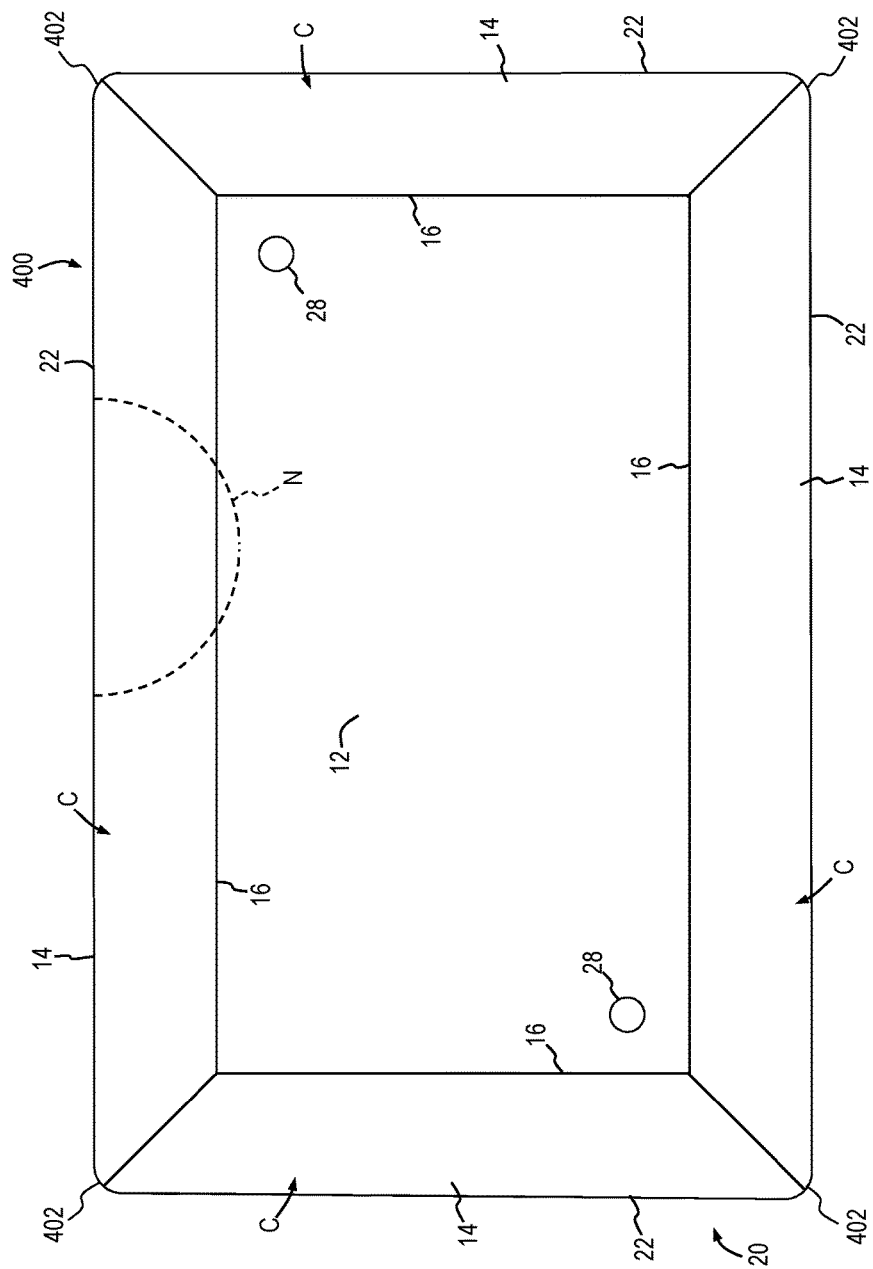
FIG. 14 is a top plan view of an exterior face of an insulation forming device according to still another alternate embodiment of the present invention.

An insulation forming device 400 is shown in FIG. 14 according to still another embodiment of the present invention. Insulation forming device 400 includes a plurality of rounded or chamfered corners 402 rather than generally squared-off corners 25, as shown in FIGS. 1-3. In one embodiment corners 402 may have a radius of about 0.3 inches. Outer edges 22 may likewise be rounded or chamfered between interior portion 18 and exterior face 20. Insulation forming device 400 is otherwise similar to any of the previously described insulation forming devices.

FIGS. 15A-15F show various views of an insulation forming device 500 according to yet another embodiment of the present invention. Example dimensions for insulation forming device 500 include outer dimensions having a width "W" and length "L" of about 9×14 inches respectively. Other example outer dimensions for width "W" and length "L" may include, without limitation, about 6⅞×14 inches respectively and about 10⅞×14 inches respectively. Closure 12 may have a length "LC" of about 9 inches and a width "WC" of about 4⅖ inches. Further example dimensions for forming device 500 include a thickness "T" of about 3/32 inches, a vertical rim dimension "VR" of about ⅛ inch, a height "H1" of about 1⅛ inches with respect to VR, corner radii "R" of about 0.3 inches, and an overall height "H2" of about 1¼ inches. It should be noted that these dimensions and all dimensions described herein are for illustrative purposes only and are not intended to be limiting in any way.

Figure 16:
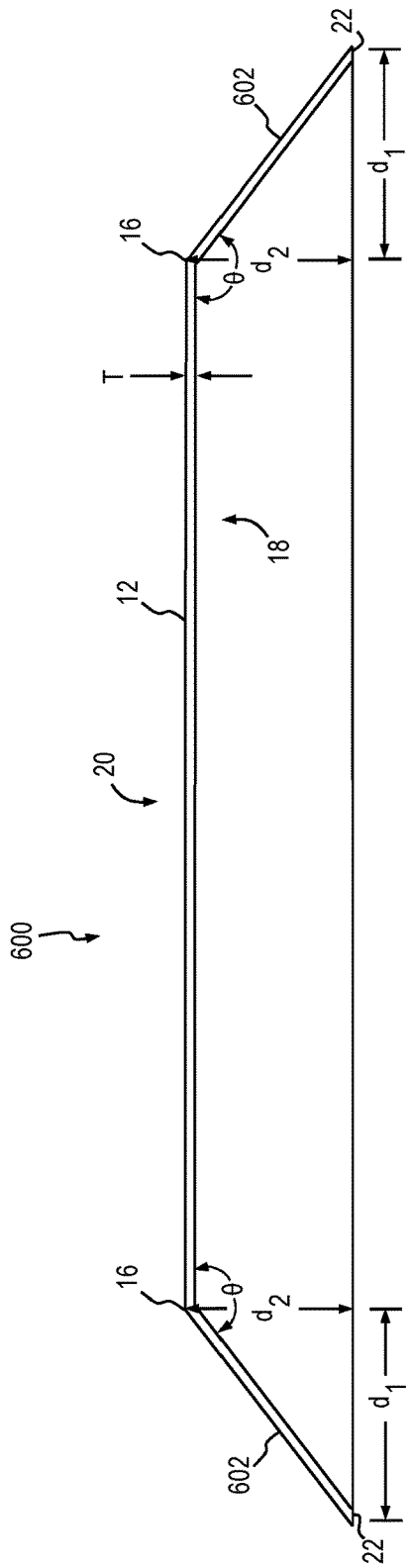
FIG. 16 is a view in section of an insulation forming device according to still another embodiment of the present invention.

Referring to FIG. 16, in still another embodiment an insulation forming device 600 includes lip members 602 that are generally planar and are oriented at an angle θ with respect to closure 12. Insulation forming device 600 is otherwise similar to any of the previously described insulation forming devices.

In some situations a rim joist or other space to be insulated may include obstructions that prevent an insulation forming device from closing off an opening of the space to be insulated. The insulation forming device may accordingly be modified by trimming and/or cutting clearance slots, openings, notches, curves, and so on in the insulation forming device such that it fits around the obstructions and substantially closes off the opening of the space to be insulated. As a non-limiting example a notch "N," shown in broken lines in FIG. 14, may be trimmed away from insulation forming device 400 to provide clearance around an obstruction such as a pipe. Any of the insulation forming devices discussed herein may be modified to fit around obstructions.

Figure 17:
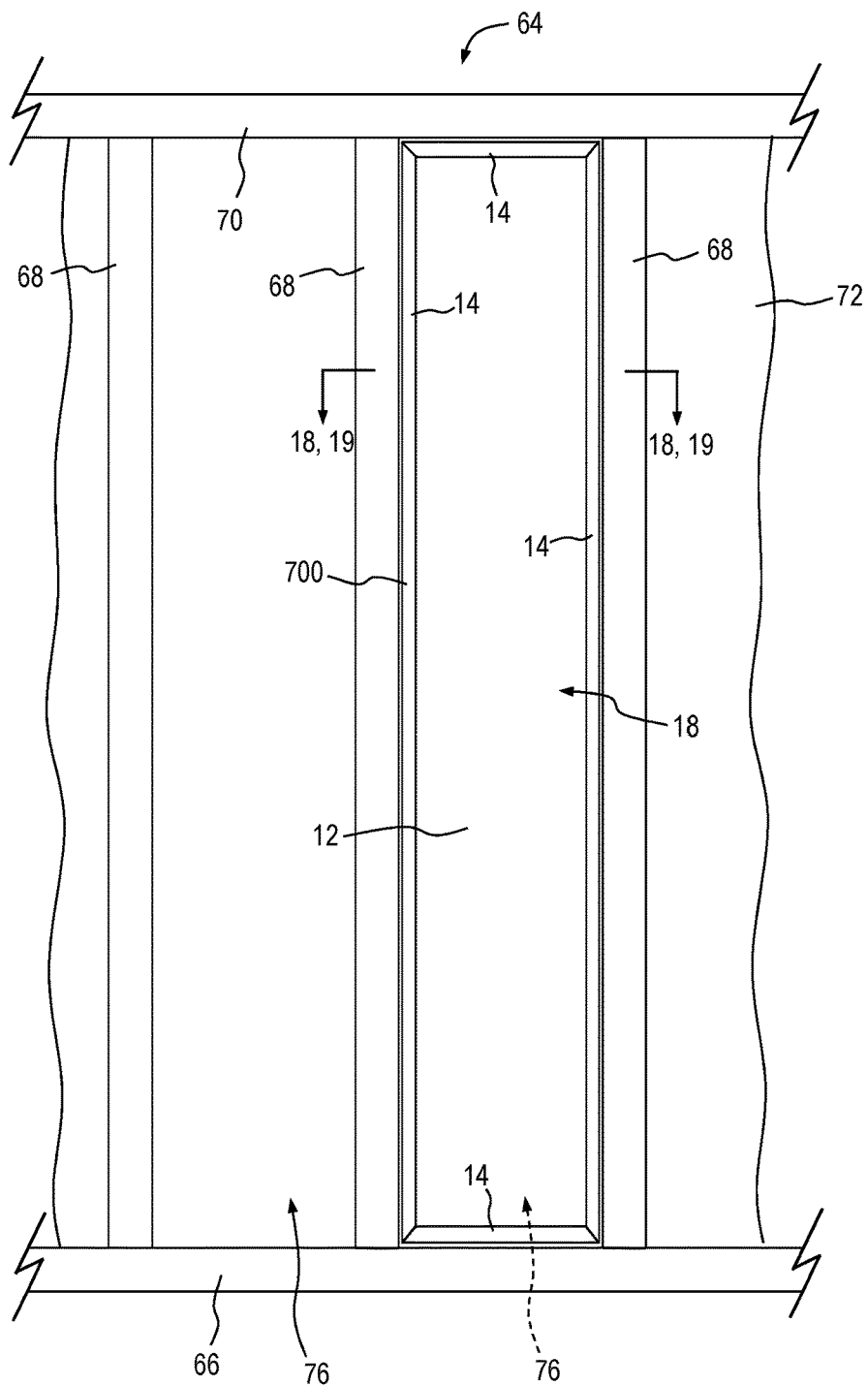
FIG. 17 is an elevational view of an insulation forming device according to another embodiment of the present invention.
Figure 18:
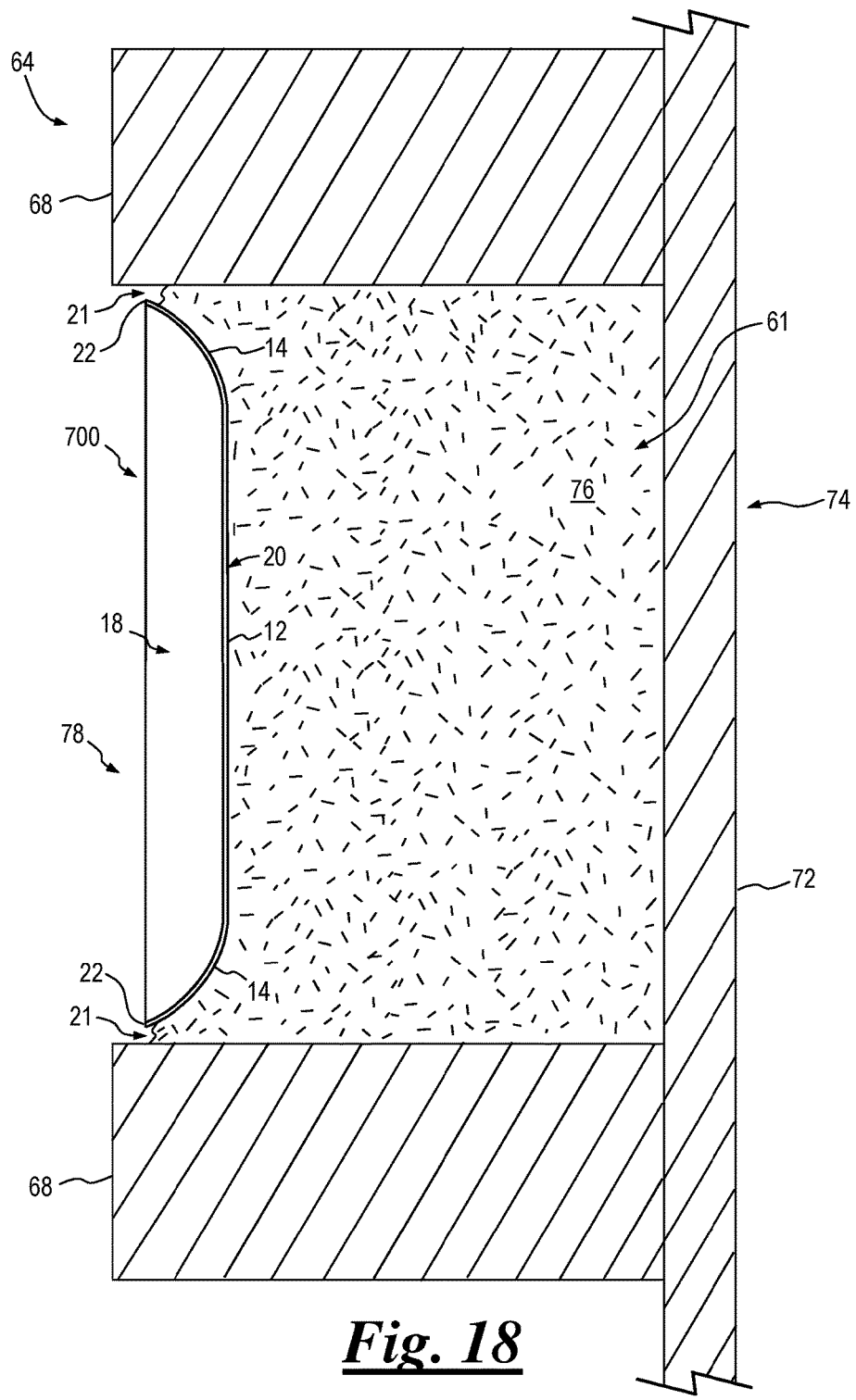
FIG. 18 is a view in section of a portion of FIG. 17 with an insulation forming device in place.

With reference to FIGS. 17 and 18 a building structure 64, such as a wall, comprises a bottom plate 66 that supports a plurality of studs 68 and a top plate 70. A covering material 72, such as plywood or drywall, closes off a first side 74 of the structure 64. Together, bottom plate 66, studs 68, top plate 70 and covering material 72 delimit stud pockets 76 having openings 78. An insulation forming device 700, shown in FIGS. 17 and 18, may be used to form insulation in stud pockets 76.

With reference to FIGS. 17 and 18 together, in use of insulation forming device 700 a suitable amount of expanding-foam insulation 61 is dispensed onto exterior face 20 of closure 12 by any suitable means. Alternatively, the insulation 61 may be dispensed into stud pocket 76.

Once the expanding-foam insulation 61 has been dispensed onto exterior face 20 (and/or into stud pocket 76) insulation forming device 700 is placed into opening 78 with the exterior face of the insulation forming device facing into the opening (i.e., toward covering material 72), thereby substantially closing off the opening. Insulation forming device 700 may be sized and shaped to substantially close off opening 78 with a gap 21 between outer or distal edges 22 of lip members 14 of the insulation forming device and at least a portion of the aforementioned edges and surfaces delimiting the opening of the stud pocket 76, as shown in FIG. 18.

As the insulating foam 61 expands within stud pocket 76 it generally confronts exterior face 20 and generally conforms to the exterior face of insulation forming device 700, thereby taking on the shape of the exterior face, which may include the exterior surfaces of closure 12 and lip members 14. After a period of time insulating foam 61 is cured, typically by air-drying. When the insulating foam 61 has cured insulation forming device 700 may be removed from opening 78. In doing so, insulation forming device 700 is easily separated from the cured insulating foam 61 by virtue of the non-stick nature of the material selected for the insulation forming device and/or the non-stick coating or release agent that is applied to exterior face 20, as discussed above.

Once removed, insulation forming device 700 may be re-used for insulating other stud pockets 76. Alternatively, if desired, the above-described insulating process may be repeated for select stud pockets 76, thereby "stacking" together facially adjacent cured layers of insulating foam 61 to build up a relatively thick layer of cured insulation in the boxes.

Figure 19:
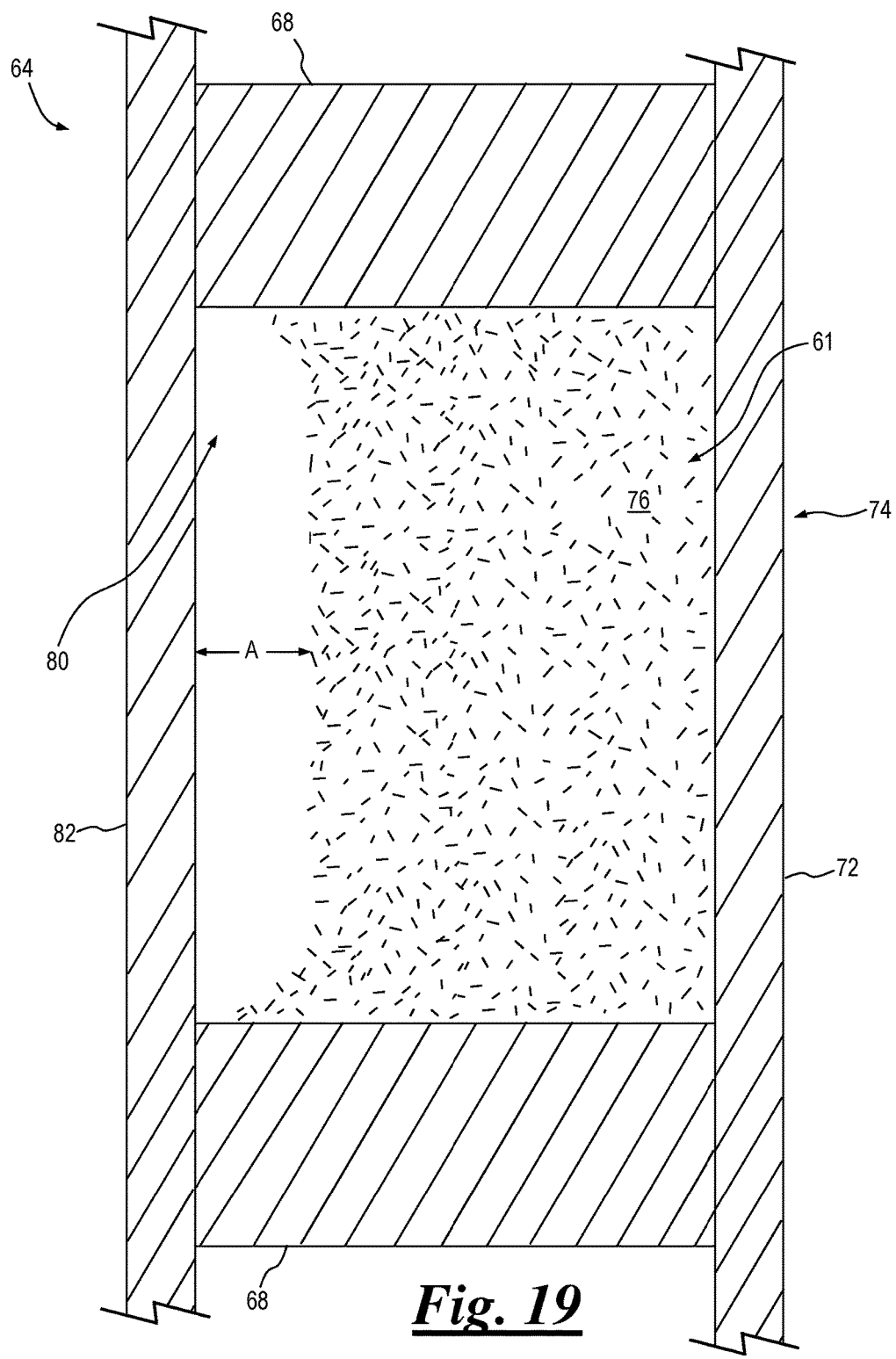
FIG. 19 is a view in section of a portion of FIG. 17 after the insulation has cured and the insulation forming device has been removed.
Figure 20A:
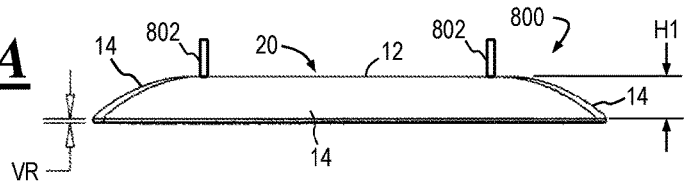
FIGS. 20A-20F show side elevational, end elevational, top plan, sectional, interior perspective and exterior perspective views respectively of an insulation forming device with guides according to yet another embodiment of the present invention.
Figure 20B:
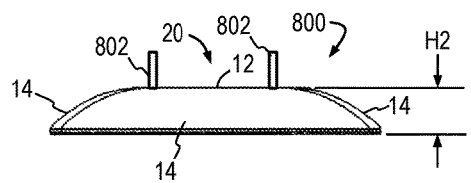
Figure 20C:
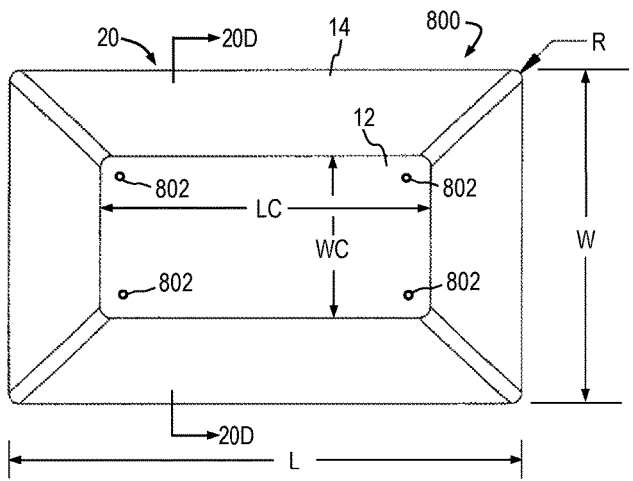
Figure 20D:
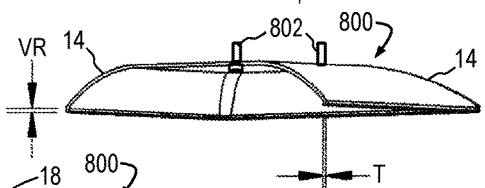
Figure 20E:
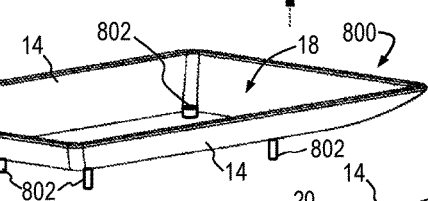
Figure 20F:
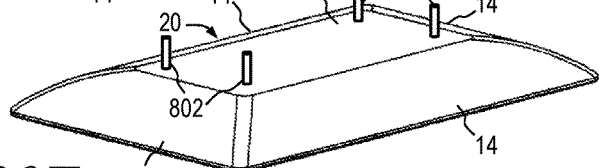

As shown in FIG. 19, in one configuration the insulated stud pocket 76 includes an air pocket or "chase" 80 between insulating foam 61 and an adjacent second covering material 82, such as plywood or wallboard, after insulation forming device 700 is removed. Air pocket 80 may have any suitable air pocket spacing "A" between insulating foam 61 and covering material 82. For example, air pocket spacing "A" may be about 1¼ inches. Insulation forming device 700 is otherwise similar to any of the previously described insulation forming devices.

FIGS. 20A-20F show various views of an insulation forming device 800 according to yet another embodiment of the present invention. Insulation forming device 800 is similar to insulation forming device 500, but further includes one or more guides 802. Guides 802 are removably secured with their longitudinal axes approximately perpendicular to closure 12 and extending outward from the exterior face 20.

Figure 21:
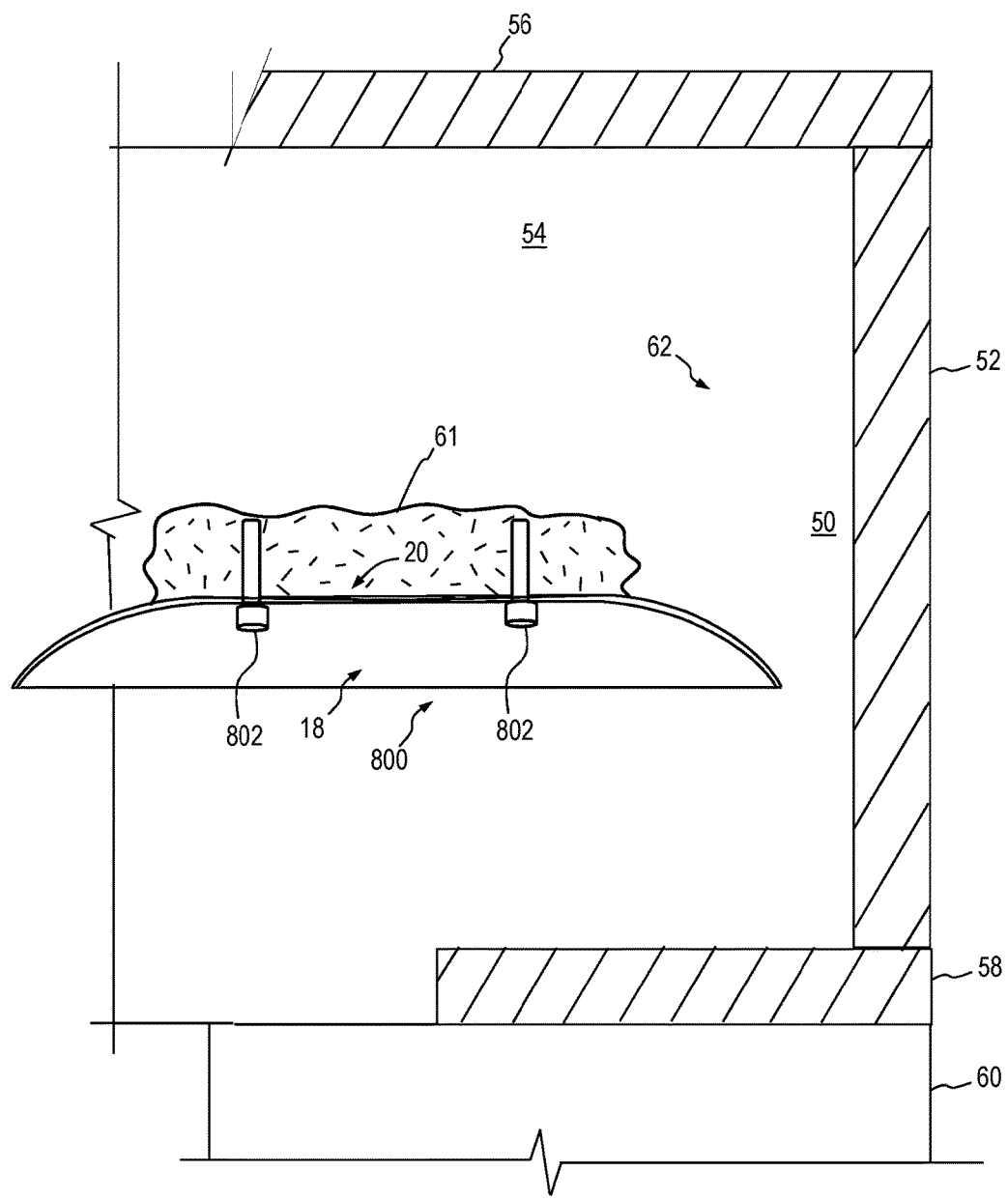
FIG. 21 is a view in section of a portion of the rim joist box of FIG. 7 showing use of the insulation forming device of FIG. 20A.
Figure 22:
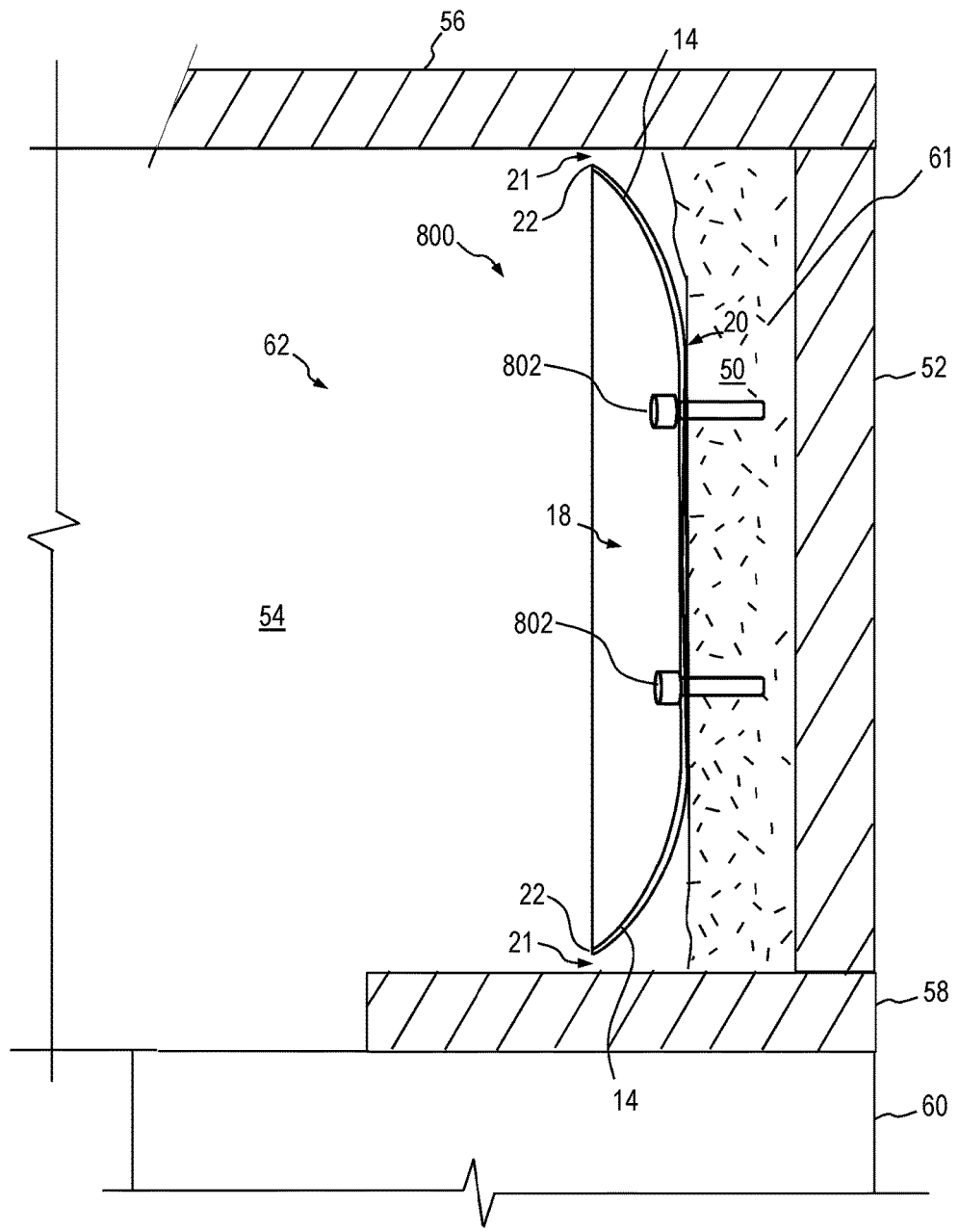
FIG. 22 is the section view of the rim joist box of FIG. 21 showing the application of the first insulation layer.
Figure 23:
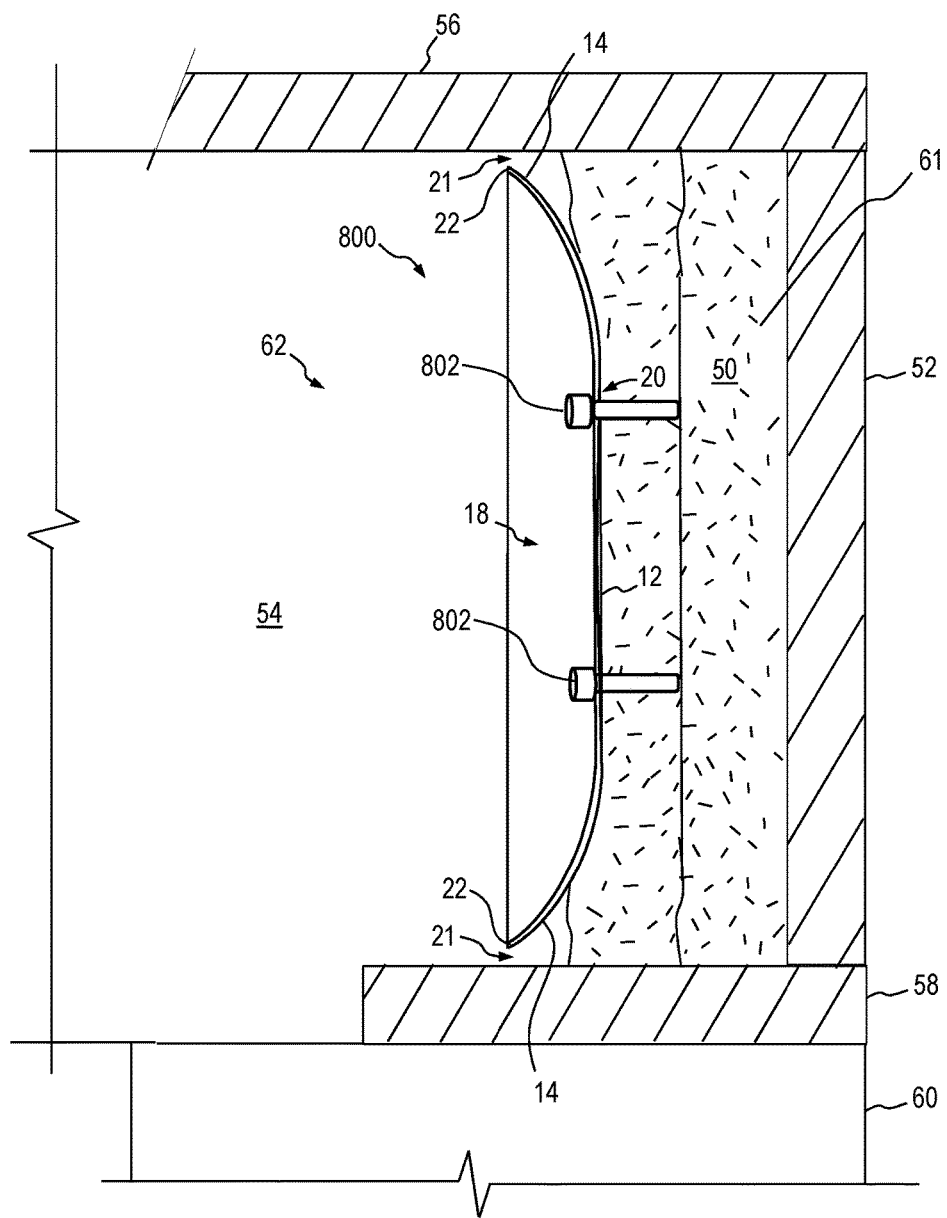
FIG. 23 is the section view of FIG. 22 showing the application of the second insulation layer.

Referring to FIGS. 21-23, guides 802 provide various advantages. They can act as spacers to assist the operator in correct horizontal distance placement of the device from rim joist 52 inside rim joist box 50. Those of skill in the art will appreciate that guides 802 can be sized accordingly. Utilizing four spaced-apart guides 802 also provides a vertical alignment tool. Additionally, guides 802 assist in stabilizing and maintaining insulation 61 in place against closure 12 as insulation forming device 800 is moved and rotated from a first horizontal foam acceptance position to a second, vertical foam placement position adjacent to rim joist 52.

Guides 802 are also useful for visual depth indication as foam is initially applied to closure 12 while guides 802 are upwardly facing as depicted in FIG. 21 to afford a relatively uniform thickness of insulation 61 as applied to closure 12. The insulation has an initial flexibility and fluidity in a pre-hardened/cured state. When insulation forming device 800 is rotated from the first position (FIG. 21) to the second position (FIG. 22), insulation 61 can shift out of shape and uniformity. Guides 800 mitigate this unwanted effect. The adhesive properties of insulation 61 allow it to adhere to the guides 802 and stabilize, thus remaining uniform as insulation forming device 800 is rotated and moved into place inside rim joist box 50. Thereafter, guides 802 serve to anchor insulation forming device 10 in place while the foam adheres to the joists and hardens. Guides 802 are thereafter removed (e.g. threaded guides 802 are "unscrewed" by hand with the assistance of an appropriately sized screwdriver) prior to removal of device 10.

Guides 802 may be any suitable removable projection, and preferably are fasteners, such as screws or bolts (the threads thereof having a desirable "grabbing" effect). The top of guides 802 can include hex heads (for unscrewing with a socket) or heads with tool slots (e.g. for use with philips or flat head screwdriver). A tool may be used to install guides 802 through openings in closure 12 with the heads accessible from interior 18. Guides 802 are preferably threaded, with the threads providing additional surface area configured to adhere to insulation 61. Thus, the threads provide an additional gripping quality to guides 802 to hold insulation 61 uniformly against insulation forming device 800.

In one embodiment, insulation forming device 800 is positioned near or inside opening 62 of rim joist box 50 in the first horizontal foam acceptance position. Exterior face 20 is lightly misted with water to form a thin, first aqueous layer. Insulation 61 is then applied to exterior face 20 of closure 12 to surround and enclose guides 802 to form a generally uniform first insulation layer. In one embodiment, the layer is about 1.5 inches to 2 inches in thickness. The exterior side of the first insulation layer is then lightly misted with water to form a thin, second aqueous layer. The first and second aqueous layers act to enhance the expansive properties of the foam insulation. Insulation forming device 800 is then placed into opening 62 and rotated into the second vertical foam placement position with the exterior face of the insulation forming device (and insulation 61) facing into the opening (i.e., toward rim joist 52), thereby substantially closing off the opening.

Even though insulation forming device 800 may be translucent, insulation 61 is typically opaque. Thus, it is difficult for the operator to judge the approximate horizontal distance to be maintained from exterior face 20 to rim joist 52. The length of guides 802 can be configured to allow tactile feedback to correspond to the desired placement in horizontal distance from exterior face 20 to rim joist 52. In one embodiment, the guides are about 1 inches to about 1.5 inches in length.

As the vertical rim VR is formed substantially perpendicular to closure 12, the vertical rim acts to facilitate the moving/sliding of insulation forming device against or adjacent to floor joists 54, subfloor 56 and/or sill plate 58. In use, when insulation forming device 800 is moved/slid toward rim joist 52, closure 12 is substantially parallel to the rim joist. Thus, vertical rim VR is substantially parallel to floor joists 54, subfloor 56 and sill plate 58.

The operator pushes horizontally against interior 18 of insulation forming device 800, moving or sliding the device back until the tips of guides 802 hit against the surface of rim joist 52. As guides 802 are all the same length, they act to align closure 12 approximately vertical and parallel to rim joist 52 as the tips of the guides hit against the surface of rim joist 52. Alternatively, guides 800 can be used to sense the rear wall of the rim joist, then the user can manually retract device 10 to allow more room for expansion. A cavity is thus formed.

Insulation forming device 800 is then temporarily held in position by the user while the insulation expands and begins to conform to the cavity. The user can then release the device after allowing the insulation to sufficiently harden, and device 800 will remain adhered to the insulation as the insulation continues to expand and harden within the cavity (e.g. rim joist box 50).

Insulation 61 generally expands against exterior face 20, urging it horizontally outward slightly, and generally conforms to the exterior face of insulation forming device 800, thereby taking on the shape of the exterior face, which may include the exterior surfaces of closure 12 and lip members 14. After a period of time, insulating foam 61 is cured, typically by air-drying. When the insulating foam 61 has cured, guides 802 may be removed with a tool from interior 18 to keep the first insulation layer intact. Insulation forming device 800 may then be removed from opening 62. Once removed, insulation forming device 800 may be re-used for applying a second insulation layer, guides 802 being re-inserted, and the above-described insulating process may be repeated. Insulation forming device 800 may be moved/slide back until the tips of guides 802 hit against the surface of the first insulating layer, thereby "stacking" together facially adjacent cured layers of insulating foam 61 to build up a relatively thick layer of cured insulation in the boxes.

Although the present invention has been described in connection with expanding-foam insulation, it should be noted that the various embodiments of the present invention described herein may likewise be utilized to form non-expanding and minimally-expanding types of foam insulation. When used with these types of insulation the forming device may be urged against an uncured quantity of insulation, causing the insulation to conform to the shape of the forming device.

While this invention has been shown and described with respect to a detailed embodiment thereof, it will be understood by those skilled in the art that changes in form and detail thereof may be made without departing from the scope of the claims of the invention.

What is claimed is:

1. A method for applying insulation, comprising the steps of: obtaining a forming device with a closure, an exterior face, a plurality of lip members extending away from the closure, the lip members being contiguous with, and surrounding the closure, the plurality of lip members being curved or angled with respect to the closure, and one or more guides removably disposed through the closure and exterior face, approximately perpendicular thereto; then disposing expandable insulation upon the exterior face; then placing the forming device into an opening, the exterior face of the forming device facing into the opening, the forming device further substantially closing off the opening so as to form a cavity; then temporarily holding the forming device in a fixed position while the insulation expands and begins to conform to the cavity; then allowing the forming device to remain in place while the insulation fully expands and hardens; then removing the one or more guides; then removing the forming device.

2. The method of claim 1 further comprising:
pre-treating the exterior face of the forming device by spraying it with water before applying the expandable insulation thereto.

3. The method of claim 1 further comprising:
the expandable insulation comprising spray-applied polyurethane foam.

4. The method of claim 1 further comprising:
post-treating the expandable insulation after it has been disposed upon the exterior face by spraying it with water.

5. The method of claim 1 further comprising:
pre-treating the opening by spraying it with water before placing the forming device therein.

6. The method of claim 1 further comprising:
the opening comprising a rim joist box.

\* \* \* \* \*